(12) United States Patent
Reynolds et al.

(10) Patent No.: US 7,961,078 B1
(45) Date of Patent: *Jun. 14, 2011

(54) METHODS AND APPARATUS FOR OPERATING A RADIO DEVICE

(75) Inventors: Matthew S. Reynolds, Cambridge, MA (US); Joseph L. Richards, Cambridge, MA (US); Sumukh N. Pathare, Waltham, MA (US); E. Rehmatulla Post, Somerville, MA (US); Yael G. Maguire, Cambridge, MA (US); Harry F. Tsai, Cambridge, MA (US); Ravikanth S. Pappu, Cambridge, MA (US); Bernd Schoner, Cambridge, MA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1298 days.

This patent is subject to a terminal disclaimer.

(21) Appl. No.: 11/455,403

(22) Filed: Jun. 19, 2006

Related U.S. Application Data

(63) Continuation of application No. 11/439,357, filed on May 22, 2006, which is a continuation of application No. 10/448,053, filed on May 29, 2003, now Pat. No. 7,075,412.

(60) Provisional application No. 60/384,539, filed on May 30, 2002.

(51) Int. Cl.
*H04Q 5/22* (2006.01)
(52) U.S. Cl. .................... 340/10.2; 340/10.3; 340/10.31
(58) Field of Classification Search .................. 340/10.2
See application file for complete search history.

(56) References Cited

U.S. PATENT DOCUMENTS

| | | | |
|---|---|---|---|
| 4,924,210 A | 5/1990 | Matsui et al. | 340/10.41 |
| 5,425,032 A | 6/1995 | Shloss et al. | 340/10.2 |
| 5,537,398 A | 7/1996 | Siwiak | 370/468 |
| 5,539,394 A | 7/1996 | Cato et al. | |
| 5,604,486 A | 2/1997 | Lauro et al. | 340/10.3 |
| 6,172,609 B1 | 1/2001 | Lu et al. | 340/10.4 |
| 6,509,828 B2 | 1/2003 | Bolavage et al. | 340/10.2 |
| 6,529,488 B1 | 3/2003 | Urs et al. | 370/345 |
| 6,617,962 B1 * | 9/2003 | Horwitz et al. | 340/10.4 |
| 6,735,426 B1 | 5/2004 | Pau | 455/255 |
| 7,110,358 B1 * | 9/2006 | Clinton et al. | 370/235 |
| 2003/0104848 A1 | 6/2003 | Brideglall | 455/574 |
| 2003/0193889 A1* | 10/2003 | Jacobsen | 370/208 |

OTHER PUBLICATIONS

Office Action for U.S. Appl. No. 11/439,357 dated Jun. 18, 2010.
Office Action for U.S. Appl. No. 11/455,508 dated Nov. 24, 2010.
Notice of Allowance for U.S. Appl. No. 10/448,053 dated Mar. 14, 2006.
Supp. Office Action for U.S. Appl. No. 11/439,357 dated Sep. 22, 2010.

* cited by examiner

*Primary Examiner* — Brian A Zimmerman
*Assistant Examiner* — Omer S Khan
(74) *Attorney, Agent, or Firm* — Foley & Lardner LLP; John D. Lanza

(57) ABSTRACT

A radio device such as a wireless tag reader communicates with multiple types of wireless identification tags in a monitored region. The radio device includes a network interface to receive messages transmitted over a network. In response to receiving a message indicating to reconfigure the radio device to support an additional wireless tag protocol, the radio is reconfigured to support communications with a corresponding new type of wireless identification tag in a monitored region. Based on this technique of reconfiguring the radio device via network messages, the radio device optionally supports additional, new or latest versions of wireless tag protocols without having to physically reprogram or replace the radio device.

46 Claims, 12 Drawing Sheets

METHODS AND APPARATUS FOR OPERATING A RADIO DEVICE

RELATED APPLICATION

This application is a continuation application claiming priority to earlier filed U.S. patent Continuation application Ser. No. 11/439,357 entitled "METHOD AND APPARATUS FOR OPERATING A RADIO DEVICE,", filed on May 22, 2006, which claims priority to earlier filed U.S. patent Continuation application Ser. No. 10/448,053 entitled "METHOD AND APPARATUS FOR OPERATING A RADIO DEVICE,", filed on May 29, 2003, which claims the benefit of and priority to U.S. Provisional Patent Application Ser. No. 60/384,539 entitled "RECONFIGURABLE IDENTIFICATION AND TRACKING SYSTEM,", filed on May 30, 2002, the entire teachings of all of which are incorporated herein by this reference.

BACKGROUND OF THE INVENTION

Wireless tag readers are commonly used in industrial plants to identify and track manufactured items. In such applications, a wireless identification tag such as an RFID (Radio Frequency Identification) tag is affixed to a monitored item such as a single packaged product or a bin or pallet containing multiple manufactured items. Typically, the wireless tag stores relevant data pertaining to and identifying the item to which it is affixed. As the wireless tag passes near a wireless tag reader, the tag reader communicates with the wireless tag to retrieve information pertaining to the tag itself and the tagged item.

Some wireless tags are 'active' in the sense that they include an antenna and transmitter capable of initiating wireless communication with a tag reader. Some active wireless tags contain only a radio transmitter, while others include a radio receiver. The transmitter may generate its own signal, or it may "backscatter" modulate the reader's transmitted signal. Active wireless tags include a power source such as a battery to power their internal electronic circuitry and generate a wireless communication signal. Typically, because of this on board power source, active tags exhibit longer transmission range (called "read range") than the passive tags described below.

In comparison to active tags, 'passive' wireless tags do not contain a power source and therefore they cannot independently generate a wireless signal to communicate with a tag reader or process digital information on their own. Instead, these passive devices rely on receiving power from an interrogating signal generated by a tag reader to power their internal circuitry. In the presence of the interrogation (or 'powering') signal, the passive tag devices are able to power themselves, retrieve data stored in their memory, and communicate the retrieved data to the tag reader. The amount of power that passive tags are able to recover from the reader's signal is generally small, so passive tags generally exhibit shorter transmission range (reduced "read range") than active tags.

Certain passive tags include a resonant circuit or antenna tuned to a particular interrogation frequency of the tag reader. In such devices, the characteristics of the resonant circuit are altered via switching (e.g., switching a resistor, inductor, or capacitor in and out) to modulate a signal to a tag reader according to a stored data string associated with the tag. A modulated signal produced by switching is then re-radiated to the tag reader. The tag reader, in turn, processes the received data string associated with the tag to identify characteristics of the item or tag itself. In certain applications, the tags can store information received from the tag reader in a memory located on the tag.

In practice, tag readers are typically mounted at strategic locations in manufacturing and/or retail facilities to monitor a presence of wireless identification tags. Mounting tag readers at locations throughout a facility enables tracking movement of wireless tags and, thus, corresponding tagged items. The number of tag readers employed in a facility depends to some extent on the characteristics of the facility, as well as the operating characteristics of the tags (e.g., whether the tag is an active or passive tag, as well as on the tag's operating frequency). Specifically, applicable government radio regulations, tag type, and the size, shape and number of rooms and floors in a building are factors to consider when installing a tag monitoring system.

SUMMARY

Unfortunately, there are deficiencies associated with conventional techniques of monitoring wireless identification tags. For example, outfitting a facility with tag readers is typically expensive. In addition to the cost of the tag readers themselves, a purchaser must pay for the cost of labor to install the tag readers. Because conventional tag readers are typically designed to communicate with only one type of wireless tag (e.g., certain conventional tag readers are statically configured to support communication with tags via use of a single tag communication protocol), installation sometimes must include installing multiple types of tag readers if it is necessary to communicate with different types of wireless tags in a monitored region.

In addition to high installation costs and the cost of tag readers themselves, wireless tag protocols continuously evolve over time. For example, today's wireless tag protocols include, e.g., ISO 15693, ISO 18000, Intellitag, iCode I, Tagit, Auto-ID Center EPC protocol, EPC (Electronic Product Code). In certain cases, the communication protocols themselves change over time. Also, new wireless tag protocols (and corresponding types of tags) are constantly being developed over time. As a consequence of evolving and ever-changing wireless tag protocols, operators of wireless tag monitoring systems are faced with paying for replacement of old wireless tag readers with corresponding retrofits to communicate with new types of wireless tags.

It is an advancement in the art to provide a radio device that addresses these and other deficiencies associated with conventional wireless tag readers.

One aspect of the present invention involves providing a radio device such as a tag reader that communicates with multiple types of wireless identification tags in a monitored region. The radio device is reprogrammable to support communications with different types of tag protocols. For example, a radio device in accordance with embodiments of the invention is re-programmable to allow the radio device to be configured to communicate using a plurality of different wireless tag protocols.

To support reprogrammability, the radio device includes a network interface to receive messages transmitted over a communication network to which the present type of wireless tag reader is connected. In response to receiving a message indicating to reconfigure (e.g., reprogram) the radio device to support an additional updated or new protocol, the radio device (or, more specifically, an internal electronic circuit of the radio device such as a digital signal processor) is reconfigured, for example by means of a dynamic software download, to support communications with a corresponding type of wireless identification tag in a monitored region. Based on this technique of reconfiguring the radio device via network messages, the radio device supports additional, new or latest versions of wireless tag protocols without having to replace the radio device. In this way, a source sending the (reconfiguration) message over the network updates the radio device so that it supports a new protocol.

Although the origin of the (reconfiguration) message transmitted over the network can vary, the source is optionally an electronic device that automatically updates each of multiple radio devices by sending appropriate messages over the network. This relaxes a burden otherwise placed on an administrator that updates the radio device to support new or updated protocols.

In this manner, a single re-programmable radio device provided in accordance with embodiments of the invention can be remotely reconfigured and re-programmed to continually evolve and support new or changing radio frequency tag identification protocols as such protocols come into existence or as existing protocols change to include new features such as additional types of communication messages. Since embodiments of the invention are remotely re-programmable, no manual visitation and/or human modifications to the radio device are required to allow the radio device such as a tag reader to communicate using new or updated versions of tag identification protocols. Once programmed to communicate with a required set of protocols for any of the different types of tags that are within radio range of the radio device, the radio device described herein can operate each of the multiple tag protocols in a concurrent manner to communicate with all "visible" tags in a monitored region.

In operation, to increase efficiency of monitoring wireless tags in a particular region, the radio device at least occasionally performs a query to determine each type of wireless identification tag present in the monitored region. For the identified types of wireless identification tags detected in the monitored region, the radio device schedules additional radio communications directed to only those types of wireless identification tags detected in the monitored region.

In the course of communicating with the different types of wireless communication tags, the radio device collects relevant information about the tags and stores the information in a database at the radio device. The database in the radio device is optionally part of an overall hierarchical database distributed over the network.

In one application, the radio device generates wireless signals over multiple carrier frequencies to communicate with the different types of wireless identification tags. To increase throughput (and if supported), the radio device can simultaneously generate wireless signals from the radio device at different carrier frequencies to communicate with at least two different types of wireless identification tags at the same time. Even though different carrier frequencies are used to transmit information to different wireless identification tags, the radio device optionally uses a common baseband to receive data information from responding wireless identification tags. Use of a common baseband to modulate data onto different carrier frequencies reduces circuit complexity because a common circuit can be used to recapture information in the baseband signals.

Another aspect of the present invention is directed towards a wireless transceiver device that communicates with multiple types of wireless identification tags in a monitored region based on use of a corresponding set of radio communication protocols. The wireless transceiver device includes a scheduler to schedule radio communications associated with the corresponding set multiple of radio communication protocols and an interleaver that interleaves portions of the scheduled radio communications associated with the set of radio communication protocols.

Interleaving portions of (logical) transactions associated with multiple protocols increases efficiency of scheduling radio communications to different types of wireless identification tags. Thus, the rate of monitoring a region for wireless identification tags can be increased. Additionally, breaking down the protocols into portions or work units supports more efficient collection of data information associated with the wireless identification tags in the monitored region because the radio communications can be scheduled in many more ways than simply scheduling one entire radio communication protocol transaction after the other. That is, embodiments of the invention avoid having to perform an entire sequence of all messages associated with a particular tag protocol before executing another tag protocol.

In particular, when programming a radio device to support multiple specific tag reading protocols, the radio device is programmed with knowledge of how each protocol can be logically broken down into work units, portions or sub-portions. A portion of a protocol or work unit generally represents a subset of messages such as a single transmission message (e.g., a message generated by a tag reader to the tags) and its corresponding reply (e.g., received back from tags) as a result of executing the protocol. In other words, a work unit is a component or subset of one or more messages that collectively form the tag communication (e.g., reading) protocol. Each individual message is generally a predetermined wireless transmission generated by the radio device over one or more specific radio frequencies to communicate with tags that "speak" that protocol. Breaking each tag communication protocol into portions or work units, the radio device can interleave, overlap or otherwise multiplex execution of different work units associated with different types of tag protocols over time such that the radio device can concurrently or simultaneously carry out communication with multiple of multiple types of wireless tags.

As an example, the radio device can be programmed, as will be explained, to perform one or more work units or portions of a first protocol, followed by (or possibly at the same time as) one or more work units or portions of a second protocol, followed by one or more work units or portions of yet a third protocol, and so forth. Breaking down at least some of the protocols into work units enables interleaving of messages that support to communication with multiple types of wireless identification tags.

In certain embodiments of the invention, the process of selecting which portions of a protocol to interleave with other work units as well as how much time to allocate for each type of protocol depends on scheduling rules for the different protocols. Interleaving may include round-robin scheduling, random scheduling, or using other techniques explained herein. During the operation of interleaving multiple radio frequency tag identification protocols using a single programmable tag reader, a scheduler and interleaver in the radio device can thus keep track of which work units associated with each of different protocol have been executed and which work units need to be performed next.

The scheduler has flexibility when scheduling portions of the radio communications based on different protocols. For example, in one application, the scheduler randomly interleaves portions of the radio communications for each of the multiple types of wireless identification tags. In another application, the scheduler interleaves portions of the radio communications for each of different protocols in a round robin fashion. In yet another application, the scheduler selectively schedules the portions of radio communications to allocate more scheduling time for a particular type of protocol than another. In still another application, the scheduler identifies redundant portions of the radio communications and schedules only non-redundant portions of the radio communications. Further, in yet another application, the scheduler schedules portions of the radio communications based on priority to more frequently check a presence of a certain type of wireless identification tags in the monitored region. The scheduler also can employ any combination of the aforementioned techniques to schedule radio communications.

Such embodiments of the radio device of can thus account for a variety of different physical environments in which the ability to read tagged items varies. For example, if a monitored region includes one type of tag associated with items that are relatively stationary (i.e., the tagged items do not move at all, or move very slowly, or move rather infrequently) while other types of tagged items associated with a different tag protocol move rapidly from one location to another (e.g., tagged items move quickly through a region on a conveyor belt in a manufacturing facility), embodiments of the invention can provide for proper scheduling of these two (or more) different types of tag protocols to account for the fact that it may be necessary to monitor one type of tag at a higher rate than another. Accordingly, the scheduler may use a priority scheduling technique to more frequently execute or schedule work units associated with the protocol used to communicate with the fast-moving tagged items.

Yet another aspect of the present invention is directed towards a radio device that monitors a presence of wireless identification tags in a region. The radio device (and potentially each of other similar radio devices that collectively form a distributed or hierarchical database) includes a network interface and a processor. The network interface receives a network message including an agent generated by a source at a remote location. The processor executes the agent and, in response to satisfying a condition of the agent, reports data information associated with the wireless identification tags back to the source (or another designated recipient) via the network interface. Based on this technique of executing the agent at the radio device such as a wireless identification tag reader, the remote sources control the collection of data at the radio device and reporting of the data back to the source or other recipient. In one application, the agent acts as a filter that selects which type of data to transmit back to the source or otherwise intended recipient.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily drawn to scale, emphasis instead being placed upon illustrating the principles of the present invention.

DETAILED DESCRIPTION

As discussed in the summary above, one aspect of the present invention is directed to a radio device such as a tag reader that communicates with multiple types of wireless identification tags in a monitored region. The radio device includes a network interface to receive messages transmitted over a network. In response to receiving a message indicating to reconfigure the radio device to support an additional protocol, the radio device is reconfigured to support communications with a corresponding additional type of wireless identification tag in a monitored region. In addition to a network interface, each radio device includes a database to manage and store information associated with multiple types of wireless identification tags.

As an example, radio devices can be multiple tag readers interconnected via a network to form a distributed system. Each tag reader in such a system is responsible for managing its local population of wireless identification tags. For example, each tag reader acts as a gateway between relatively 'dumb' tags and relatively 'smart' processing systems that enable users to make strategic business decisions depending on movement of tags (and corresponding tagged items) in a supply chain application. Each tag reader includes a database for managing its own local population of wireless tags. Thus, the network of tag readers itself can be managed as a distributed or hierarchical database system.

Although the techniques described herein are suitable for use in tag readers, and particularly to supply chain management applications, techniques discussed herein are also well-suited for other applications that employ techniques of monitoring wireless identification tags.

Figure 1:
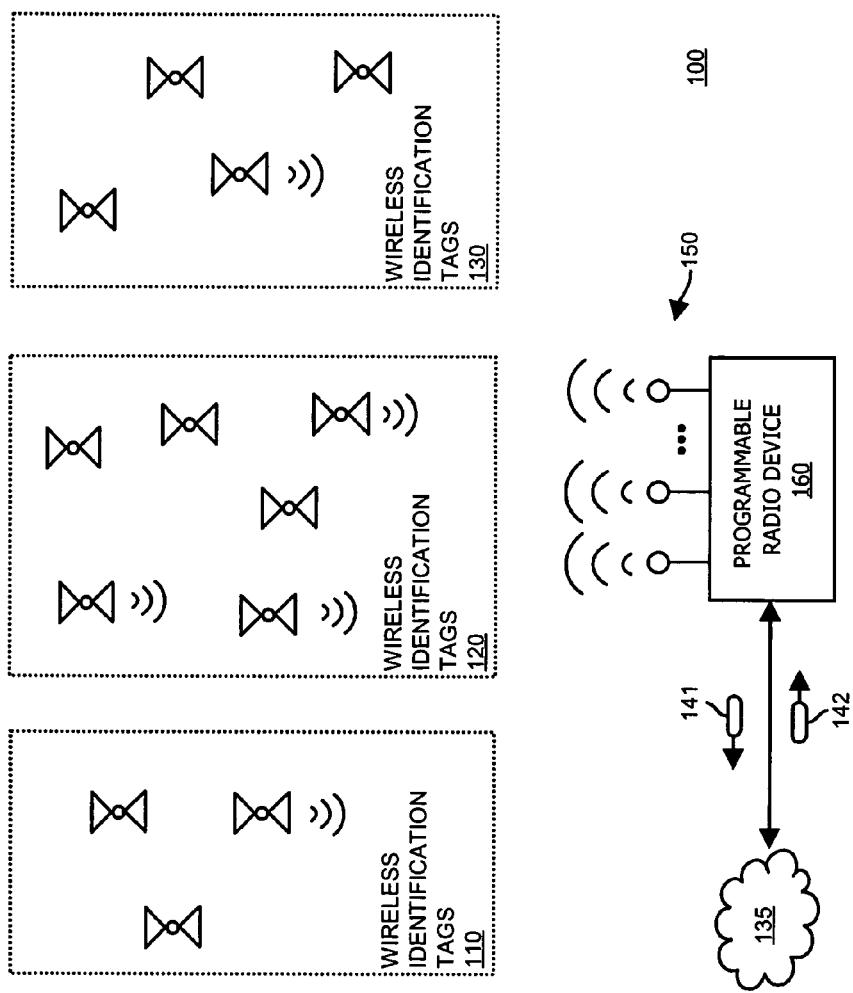
FIG. 1 is a block diagram of a communication system for monitoring multiple types of wireless identification tags.

FIG. 1 is block diagram illustrating a technique of monitoring wireless identification tags in accordance with one embodiment of the present invention. As shown, wireless communication system 100 includes programmable radio device 160 including transducers 150, network 135, and different types of wireless identification tags 110, 120 and 130.

In the context of a wireless tag reader application, programmable device 160 is a network node that transmits and receives messages 141, 142, respectively. Messages 141, 142 include one or multiple data packets such as those encoded according to TCP/IP (Transmission Control Protocol/Internet Protocol).

One purpose of messages 141 and 142 is to maintain or update protocols that programmable radio device 160 uses to communicate with wireless identification tags 110, 120, and 130. For example, message 142 may indicate that a new or updated protocol shall be used by programmable radio device 160 to monitor a corresponding local population of wireless identification tags 110, 120 and 130.

Programmable radio device 160 includes a network interface to receive message (or messages) 142 transmitted over network 135. In response to receiving message 142 indicating to reconfigure programmable radio device 160 (to support an additional or updated protocol), programmable radio device 160 reconfigures itself to support communications with corresponding types of wireless identification tags 110, 120, 130 in a monitored region. Accordingly, message 142 transmitted over network 135 reconfigures programmable radio device 160 so that it supports additional or modified protocols.

As mentioned, message 142 includes one or more network data packets that individually or collectively form a command or commands to update, delete, or add a new protocol supported by programmable radio device 160. In one application, message 142 includes specific parameters (such as frequency, modulation type, logic encoding scheme, bit duration, encryption, antenna type . . . ) associated with a new or updated wireless communication protocol. In another application, message 142 encapsulates a computer program in the form of source or object code which endows a reconfigurable radio device 160 with new communication capabilities, or new interface capabilities.

Another purpose of messages 141, 142 is to enable remote sources to manage functional aspects of programmable radio device 160. For example, message 142 is optionally an agent (generated by a remotely located source) that runs on programmable device 160 to filter, collect or generally maintain data and tag management tasks associated with radio device 160. Accordingly, a source sending message 142 including an agent over network 135 can control collection of data at programmable radio device 160 and which, if any, of the collected data is transmitted back to the source or other designated recipient. Programmable radio device 160 optionally executes multiple agents received from one or multiple sources. Agents can be used to collect data at programmable device 160 and send it to a designated node of a network. This will be discussed in more detail later in this specification.

As will be discussed in more detail in the following text and associated figures, programmable radio device 160 such as a wireless tag reader can be viewed as a software-defined radio device. Communications received through a network gateway define operational characteristics of such a radio device 160. This technique of supporting remote programmability is particularly beneficial in applications where a common tag reader must support communications on different frequency bands as may be required by different countries.

Figure 2:
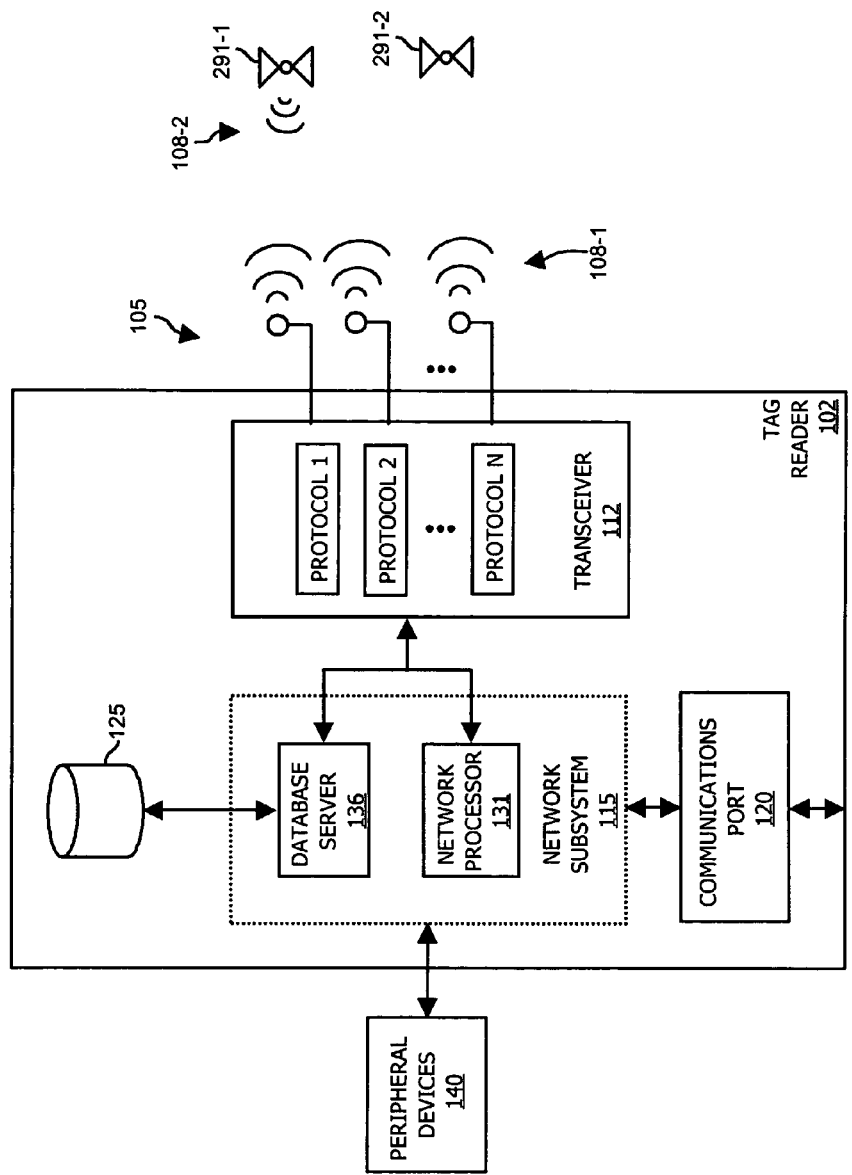
FIG. 2 is a block diagram of a reconfigurable wireless tag reader for monitoring multiple types of wireless identification tags.

FIG. 2 is a block diagram of tag reader 102 for monitoring multiple types of wireless tags using multiple protocols. As shown, tag reader 102 includes one or more sensors 105, transceiver 112, network subsystem 115, database server 136, network processor 131, communications port 120, and memory device 125. In general, tag reader 102 reads information provided by wireless identification tag 291 (or collectively, wireless identification tags 110, 120, 130), stores the information in the memory device 125, and generates messages in response to commands or queries received from remote networked clients.

In one application, tag reader 102 reads information associated with wireless tags 291 using one or more protocols, such as those associated with RFID (Radio Frequency Identification) tags. In addition to RFID tags, tag reader 102 optionally supports communication with Electronic Product Code (EPC) tags and other types of identification tags.

Collective group of sensors 105 are coupled to transceiver 112. During operation, one particular sensor 105 (or multiple sensors 105) receives wireless signal 108-2 such as a Radio-Frequency (RF) signal from one or more wireless tags 291 at the same time. As previously discussed, wireless identification tags 291 are either active or passive devices. In the latter case, tag reader 102 generates an interrogation signal that wireless identification tag 291-1 uses to power its internal circuitry and generate a reply signal such as wireless signal 108-2.

Sensor 105 converts received wireless signal 108-2 (from one or more tags 291) to a corresponding electrical signal that drive inputs of transceiver 112. Transceiver 112 processes the received electrical signal to remove any encoded information content impressed upon received wireless signal 108-2. In one application, wireless signal 108-2 is a modulated RF signal, in which tag 291 has impressed information content upon an RF carrier signal via (e.g., amplitude, frequency, or phase) modulation.

Typically, the information impressed upon wireless signal 108-2 is a characteristic data string of binary information. The characteristic data string may include an address associated with a particular wireless identification tag 291 generating the character data string. In addition to a tag address, the characteristic data string may include information such as an article or item to which wireless identification tag 291 is affixed. Information associated with tags 291 are stored in a database to track, e.g., a certain type of product to which tag 291 is affixed. Tag information includes data such as a part number, lot number, date of manufacture, owner, temperature, humidity, associated with a particular item marked with wireless identification tag 291.

Sensors 105 are generally selected for use depending on the type of wireless application of tag reader 102. For example, in one application, wireless signal 108 is an electromagnetic signal such as a Radio Frequency (RF) signal. Sensors 105 are optionally antennas designed to support transmitting and receiving data at a particular frequency range. In one application, sensors 105 associated with tag reader 102 operate at multiple frequencies (or frequency bands) such as 13.56 megahertz, 869/915 megahertz, and 2.4 gigahertz, depending primarily on the radio regulations enforced by a particular government.

In one application, sensors 105 are linearly-polarized antennas such as wire loop antennas, microstrip patch antennas, wire antennas (e.g., half-wave dipoles, or quarter-wave whips over a ground plane), horn antennas, or combinations thereof. In other arrangements, sensors 105 are circularly-polarized antennas such as orthogonal pairs of linear antennas interconnected with a 90-degree phase shift or spiral antennas. In still other applications, sensors 105 are a switched, multiplexed, or phased array of subelement antennas of any of the preceding types.

In another application, sensors 105 are optionally pressure transducer devices (e.g., microphone, speaker or ultrasonic sensor) that transmit and receive encoded pressure signals. In such an application, the transducer devices generate and detect changes in air or water pressure. Additionally, sensors 105 are optionally optical devices that transmits or receives optical signals. In yet another application sensors 105 are wire loops that support inductive coupling.

Network subsystem 115 includes database server 136 and network processor 131. Database server 136 communicates with both transceiver 112 and memory device 125. Thus, database server 136 supports retrieval of data stored in storage device 125 and queries generated by tag reader 102.

Database server 136 receives an information signal from transceiver 112, processes the received information, and stores the processed information (e.g., as objects) in a database residing in memory device 125. Processing performed by the database server 136 includes, for example, parsing the received information into one or more substrings, and time-stamping the received information.

Database server 136 translates and executes queries on behalf of clients (e.g., other servers). Prior to generating a response to a client, database server 136 translates data into an appropriate format before returning the queried result to the requesting client. In one embodiment, the database residing in memory device 125 is configured according to a Structured Query Language (SQL), i.e., as an SQL database server. This database server may return data to the network client by means of multiple protocols including TCP/IP, SQL result strings, or markup language (e.g., the extensible markup language XML).

Database server 136 itself may be configured as multiple servers. In one embodiment, database server 136 includes a tag-reader server for handling communications between the database and wireless tags 291 (or collectively 110, 120 and 130) through transceiver 112. Database server 136 further includes an applications server to handle requests for retrieving data from the database. Finally, database server 136 includes an administration server used by administrators and users to update the properties of objects in the database stored in memory device 125.

Memory device 125 optionally includes volatile and/or nonvolatile media. Volatile media includes devices such as Random Access Memory (RAM). Non-volatile media includes devices such as Electronically-Erasable Programmable Read Only Memory (EEPROM), Flash memory, ferroelectric memory, battery-backup RAM, magnetic disks and tapes, and optical storage media.

Network processor 131 communicates tag query requests through transceiver 112 to receive characteristic data strings from remote tags 291. Additionally, network processor 131 communicates via communications port 120 and with the database server 136. Thus, network processor 131 supports communications between and among tag reader 102, other networked clients, and wireless tags 291.

Tag reader 102 optionally queries tags 291 in a structured manner to avoid interference between multiple tags responding simultaneously to a query. For example, tag reader 102 optionally uses different frequency ranges (e.g., 13.56 MHz, 869/915 MHz, and 2.4 GHz) and power levels to control the distance at which tags 291 are read. Generally, lower-frequency bands are used to detect nearby tags and higher-frequency bands are used to detect more distantly located tags 291, depending on the characteristics of the tags 291, the tag reader 102, their respective antennas (105), and the materials present within the reader's electromagnetic field.

Host applications and wireless tag protocols associated with tag reader 102 can be remotely upgraded and/or reconfigured, thereby reducing the cost and complexity of maintaining such a device over its anticipated lifetime. Remote reconfiguration capability is particularly useful in applications supporting many tag readers 102 that are spread out over designated regions of a retail store.

Network subsystem 115 includes at least one processor selected from any of a number of available processors, such as one of Motorola's low-cost Dragonball family, or the Intel Xscale or StrongARM family. A Motorola processor can be scalable to 50 MIPS (Mega Instructions Per Second) using ColdFire. Network subsystem 115 includes an on-board LINUX-based kernel. Alternatively, network subsystem 115 includes software based on a Microsoft Windows-based architecture or any other networked operating system.

According to one arrangement, there are two modes of interfacing with network subsystem 115. For example, standard Internet protocols, namely, Simple Network Management Protocol (SNMP) and, for real-time data exchange, an User Datagram Protocol (UDP) are used for communication purposes. Network subsystem 115 running Linux may host application software, such as a database system. For example, the Savant database system is optionally installed to run on tag reader 102 to maintain a database stored in memory device 125.

Network subsystem 115 is optionally in communication with peripheral devices 140. Peripheral devices 140 associated with tag reader 102 include input/output devices such as user-interface buttons, displays (such as LCD or LED displays), bar-code scanners, printers, etc.

Figure 3:
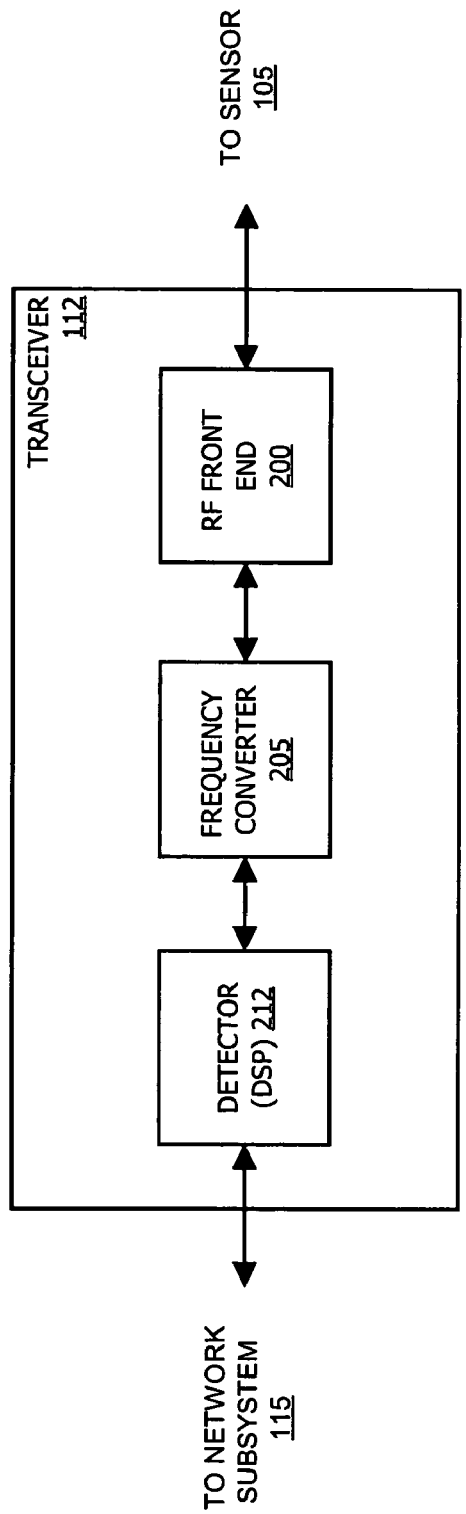
FIG. 3 is a block diagram of a transceiver for use in a wireless tag reader.

FIG. 3 is a detailed block diagram of transceiver 112. Transceiver 112 includes RF front end 200, frequency converter 205, and detector 212. RF front end 200 is coupled to sensor 105 for receiving electrical signals from sensor 105 in a receive direction and sending electrical signals to sensor in 105 a transmit direction.

In one application, RF front end 200 combines electrical signals received on multiple sensors 105 into a common signal presented to frequency converter 205. In one application, a triplexer is employed to separate (transmit) and combine (receive) the signals among each of multiple sensors 105. RF front end 200 also provides appropriate amplification or gain, such as low-noise amplification to received signals, and power amplification to transmitted signals. RF front end 200 may include filters such as high-pass, low-pass, and bandpass filters. Filtering reduces interference from other RF sources (e.g., other tag readers 102, or other electrical devices).

In a receive mode, RF front end 200 receives an electrical signal derived from wireless signal 108-2 as detected by sensor 105. RF front end 200 amplifies and filters the signal and feeds it to frequency converter 205. As its name suggests, frequency converter 205 converts the frequency of the received signal to an intermediate (or baseband) frequency. Generally, the frequency converter 'down-converts' the RF signal to a lower intermediate frequency or baseband signal.

Down-conversion may be performed in one step or in multiple steps in which the received RF signal is converted to multiple intermediate frequencies. Generally, down-converters (frequency converter 205) utilize standard techniques of frequency synthesis using hardware such as local oscillators, mixers, amplifiers and filters to down-convert the signal.

Frequency converter 205 includes one or more filters that filter the intermediate frequency or baseband signal. In certain embodiments, frequency converter 205 includes an Analog to Digital Converter (ADC) to convert a received analog intermediate frequency or baseband signal into a representative digital signal fed to detector 212 or, in turn, network subsystem 115. The representative digital signal can be encoded according to a common format associated with multiple types of wireless identification tags 291.

Detector 212 (such as a digital signal processor) receives the intermediate frequency signal and detects the information impressed upon wireless signal 108. Generally, detector 212 demodulates the intermediate frequency signal to obtain the characteristic data string associated with a responding wireless identification tag 291.

A particular demodulation scheme employed by detector 212 to retrieve a characteristic data string depends upon a protocol (and modulation technique) associated with a particular type of wireless identification tag 110, 120, 130. Modulation employed by wireless tag 291 include, e.g., amplitude modulation, frequency modulation, phase modulation, and combinations thereof.

In one application, detector 212 includes digital signal processing functionality and receives a digital representation of the intermediate frequency signal from frequency converter 205 as mentioned. Under-sampling ADC is optionally implemented to allow detector 212 to operate at a much slower sampling rate while still digitizing at a relatively high intermediate frequency (IF). This technique reduces cost and complexity with detector 212.

In a transmit mode, detector 212 generates a signal that is communicated to wireless tag 291. For example, in a DSP configured detector 210, a transmit signal is generated using direct-digital synthesis (DDS) allowing AM, FM and PM control at a data rate lower than the RF carrier rate. Frequency converter 205 generates an RF carrier signal and transmits the carrier signal to RF front end 200. RF front end 200 optionally filters and amplifies the signal before driving it to the appropriate sensor 105 (e.g., as determined by the carrier frequency). Sensor 105, in turn, converts the electrical signal to a wireless signal intended for one or more wireless tags 110, 120, 130 in a monitored region.

Figure 4:
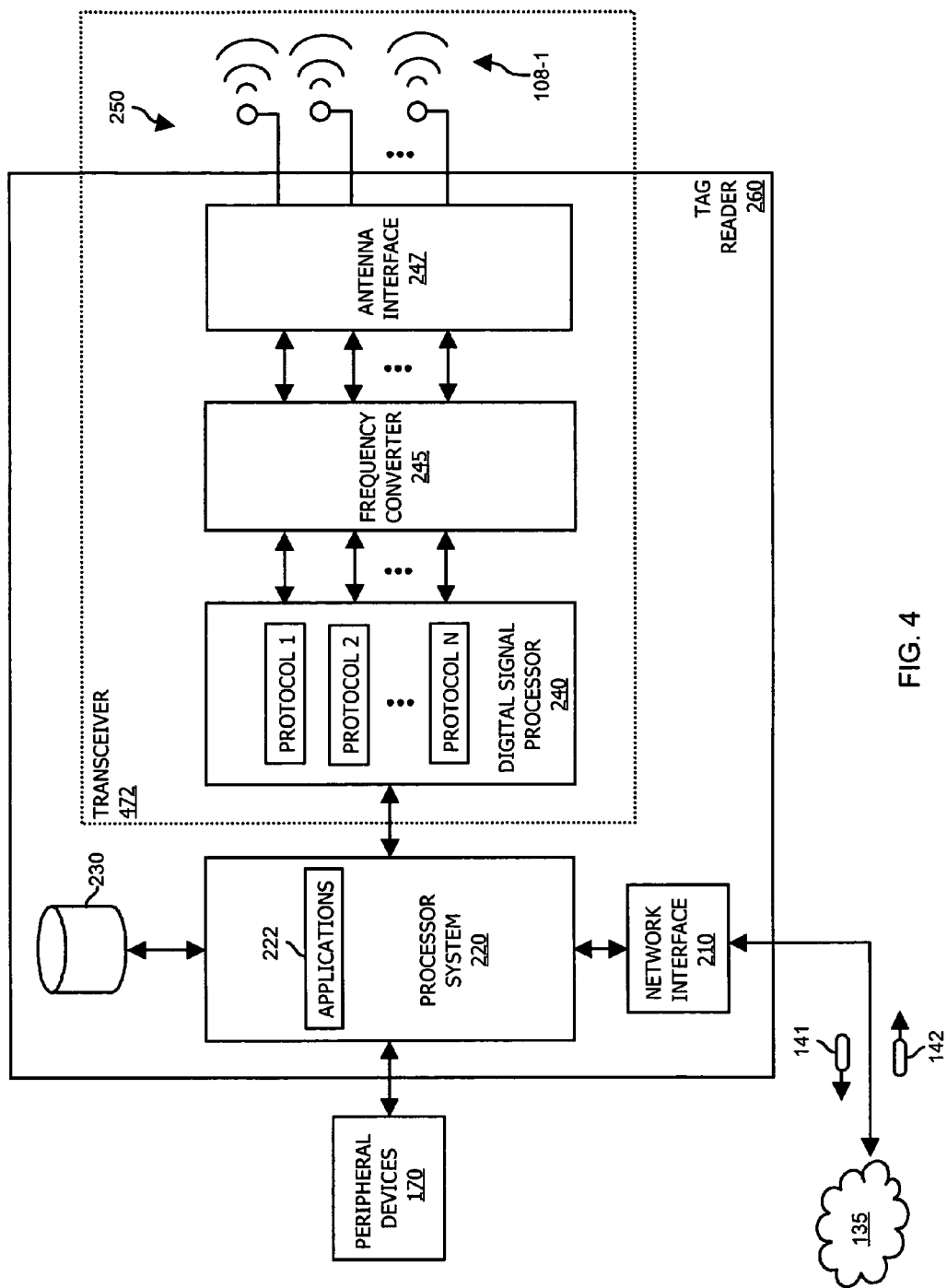
FIG. 4 is a block diagram of a reconfigurable wireless tag reader for monitoring multiple types of wireless identification tags.

FIG. 4 is block diagram of tag reader 260 in communication with peripheral devices 170 and network 135. As shown, tag reader 260 includes network interface 210, processor system 220, memory device (database) 230, digital signal processor 240, frequency converter 245, transducer interface 247, and transducers 250.

A basic task associated with tag reader 260 is the management and storage of data associated with wireless identification tags 110, 120, 130. To achieve this end, processor system 220 executes applications 222. One application involves managing data stored in memory device 230. Another application (such as a program of scheduled queries) involves monitoring a region for presence of wireless identification tags 110, 120, 130 by generating queries via transceiver 472.

Tag reader 260 includes network interface 210 to communicate with remote sources generating commands such as requests to update protocols associated with tag reader 260 for communicating with wireless identification tags 110, 120, 130. For example, one type of command received by tag reader 260 indicates to discontinue monitoring a region using a particular protocol associated with tags that are no longer used in a supply chain. Additionally, another type of command received by tag reader 260 indicates to start using a new protocol to communicate with wireless identification tags in a particular monitored region. Yet another type of command received by tag reader 260 indicates to modify an existing protocol used for communicating with wireless identification tags 110, 120, 130.

Message 142 such as a reconfiguration message optionally includes two distinct portions of data to update a protocol associated with digital signal processor 240. For example, a first portion of message 142 includes instructions to be executed by processor system 220 for reprogramming digital signal processor 240. A second portion of (a reconfiguration) message 142 includes specific data information or executable code to be executed by digital signal processor 240. Processor system 220 transfers the second portion of message 142 to digital signal processor 240 according to instructions in the first portion of message 142.

As previously discussed, messages 142 are generated by one or multiple remote sources over network 135 to manage functional aspects of tag reader 260. For example, message 142 such as an agent or daemon may include a set of tasks for execution by processor system 220. Attributes of an agent vary depending on the application but include tasks such as collection or retrieval of information stored in database 230, generation of specific queries that are performed by tag reader 260 to determine a presence of a particular type or address of wireless tags 110, 120, 130 in a monitored region, and detection of a particular event prompting generation of a reply message to a designated recipient.

In response to satisfying a condition of the agent such as detecting a certain wireless identification tag 110 in a monitored region, tag reader 260 reports data information associated with wireless identification tags 110, 120, 130 back to the source generating the agent (or another designated recipient) via messages 141. Based on this technique of executing the agent on processor system 220, the remote sources can control the collection of data associated with tag reader 260. In one application, the agent acts as a filter that selects which type of data to transmit back to the source so that it is not otherwise inundated with unwanted data from tag reader 260.

It should be noted that agents include any type of tasks to be executed by tag reader 260.

Figure 5:
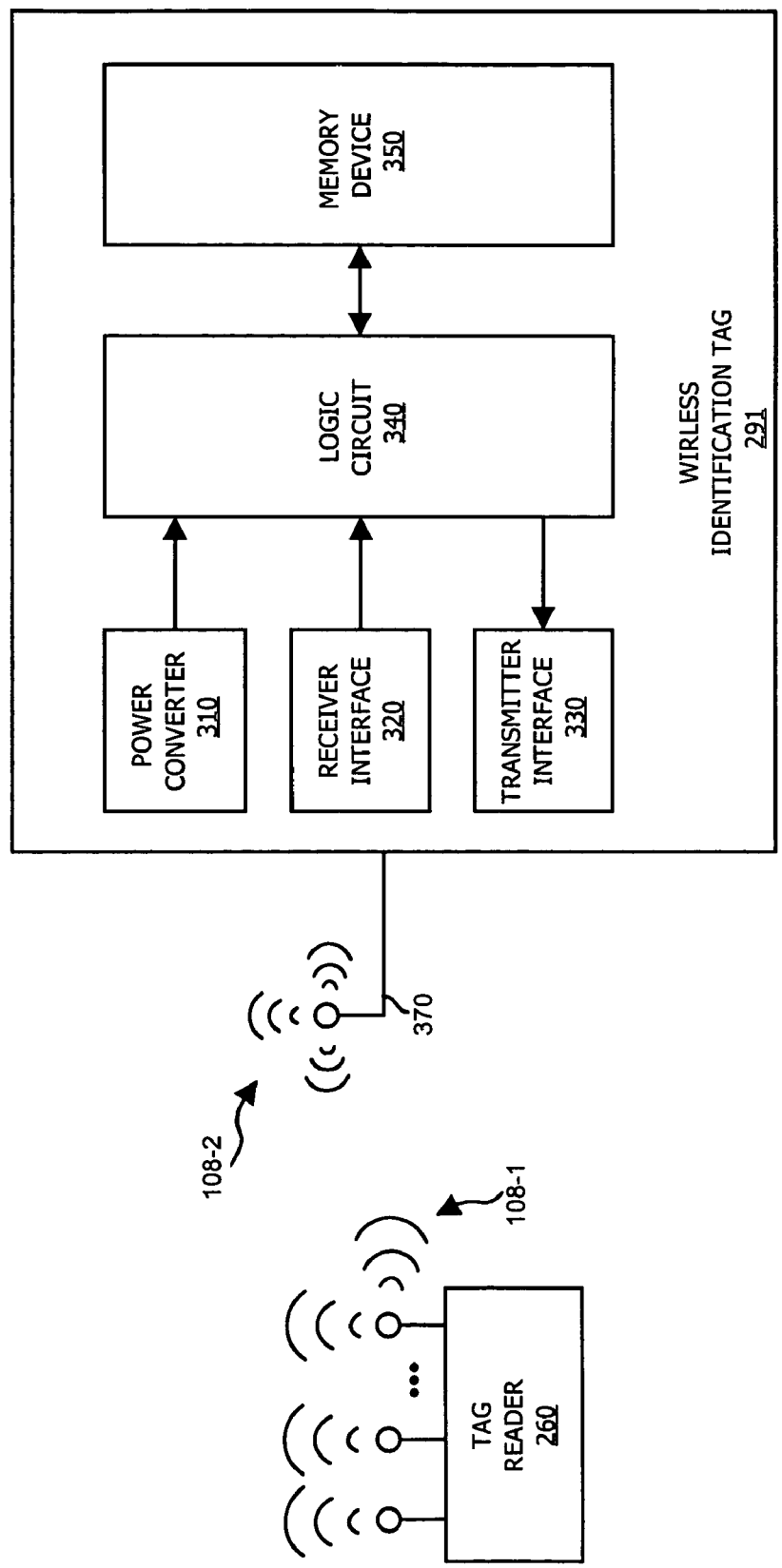
FIG. 5 is a detailed block diagram of a wireless identification tag and associated tag reader.

FIG. 5 is a block diagram of a wireless identification tag 291 and corresponding tag reader 260. As shown, wireless identification tag 291 includes transducer 370, power converter 310, receiver interface 320, transmitter interface 330, logic circuit 340 and memory device 350.

According to one embodiment, wireless identification tag 291 includes power converter 310 that converts power from wireless signal 108-1 received on transducer 370 to power wireless identification tag 291. In an alternate embodiment, power converter 310 includes a battery to power wireless identification tag 291 and associated circuitry.

When powered, logic circuit 340 processes a received query (wireless signal 108-1) generated by tag reader 260 through a combination of transducer 370 and receiver interface 320. In response to receiving a query directed to wireless identification tags 291, logic circuit 340 retrieves appropriate data (such as a characteristic data string associated with wireless identification tag 291) from memory device 350 for transmission to tag reader 260 over transmitter interface 330.

Wireless identification tag 291 optionally includes programmable memory 340. In such an application, tag reader 260 stores information in memory device 340 by generating an appropriate command to wireless identification tag 291 via wireless signal 108-1

Figure 6:
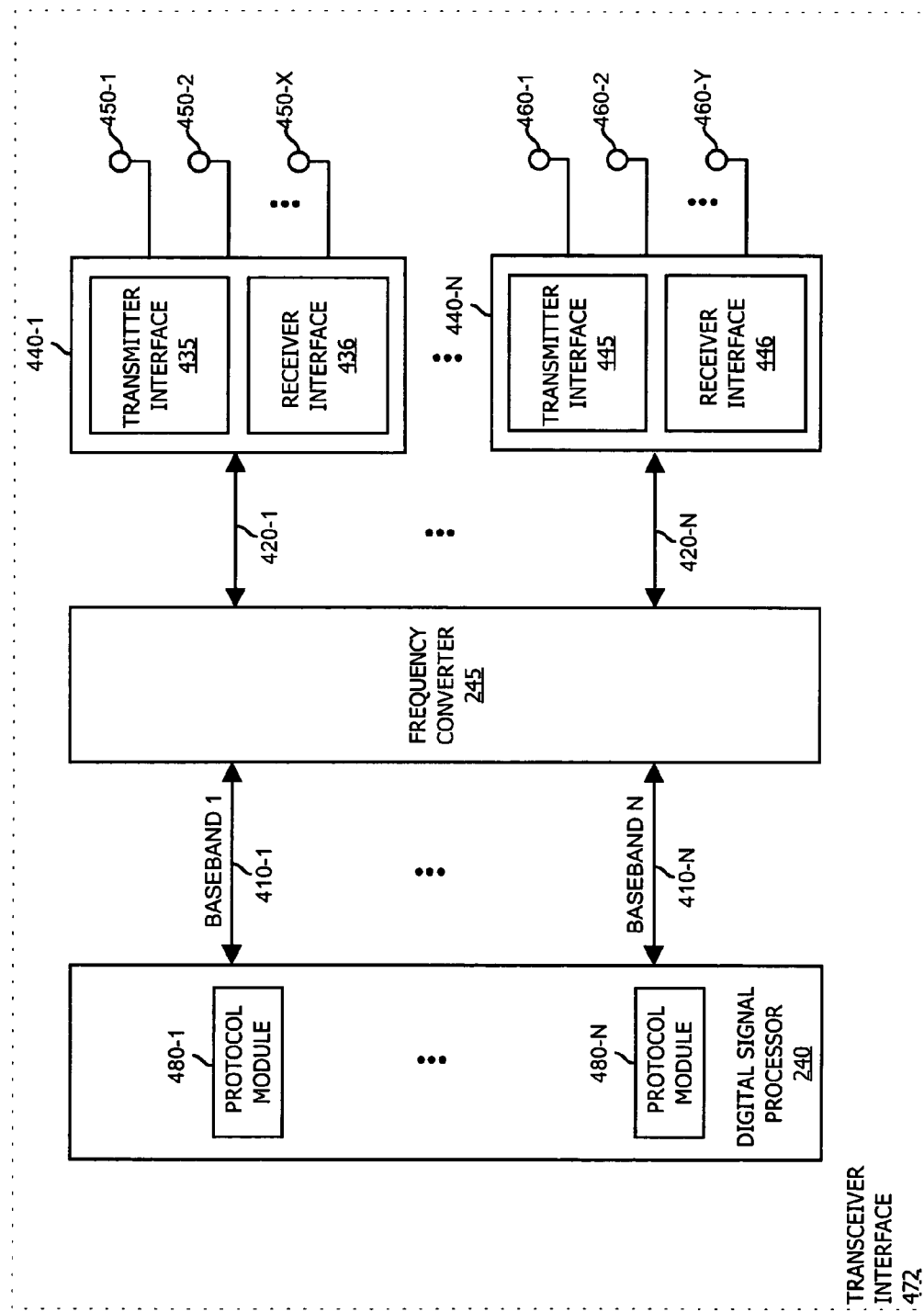
FIG. 6 is a block diagram of components associated with a tag reader.

FIG. 6 is a block diagram of transceiver interface 472 associated with tag reader 260. As shown, transceiver interface 472 includes digital signal processor 240, protocol modules 480-1, 480-2, . . . , 480-n, frequency converter 245, transceivers 440-1, 440-2, . . . , 440-n, and corresponding antennas 450, 460.

Digital signal processor 240 includes protocol modules 480-1, . . . , 480-n to support communications with each of multiple types of wireless identification tags 110, 120, 130. While in a transmit mode, protocol module 480-1 generates corresponding baseband signal 410-1 such as a digitized signal including an encoded query or other data information. Baseband signal 410-1 is fed into frequency converter 245 that, in turn, uses the baseband signal 410-1 to modulate a carrier frequency. Frequency converter 245 generates modulated carrier signal 420-1 that is fed to transmitter interface 435 of transceiver 440-1. Transmitter interface 435 drives a selected one or multiple antennas 450-1, . . . , 450-x to generate wireless signal 108-1 from tag reader 260.

In a reverse direction or receive mode, one or multiple antennas 450 associated with transceiver 440-1 receive wireless signal 108-2 generated by a wireless identification tag 291. Receiver interface 436 appropriately amplifies and filters received wireless signal 108-2 for input to frequency converter 245. Frequency converter 245 strips a corresponding carrier signal from received modulated signal 420-1 to produce baseband signal 410-1 such as a digitized signal of binary encoded information. Baseband signal 410-1 feeds the input of protocol module 480-1 of digital signal processor 240.

Figure 7:
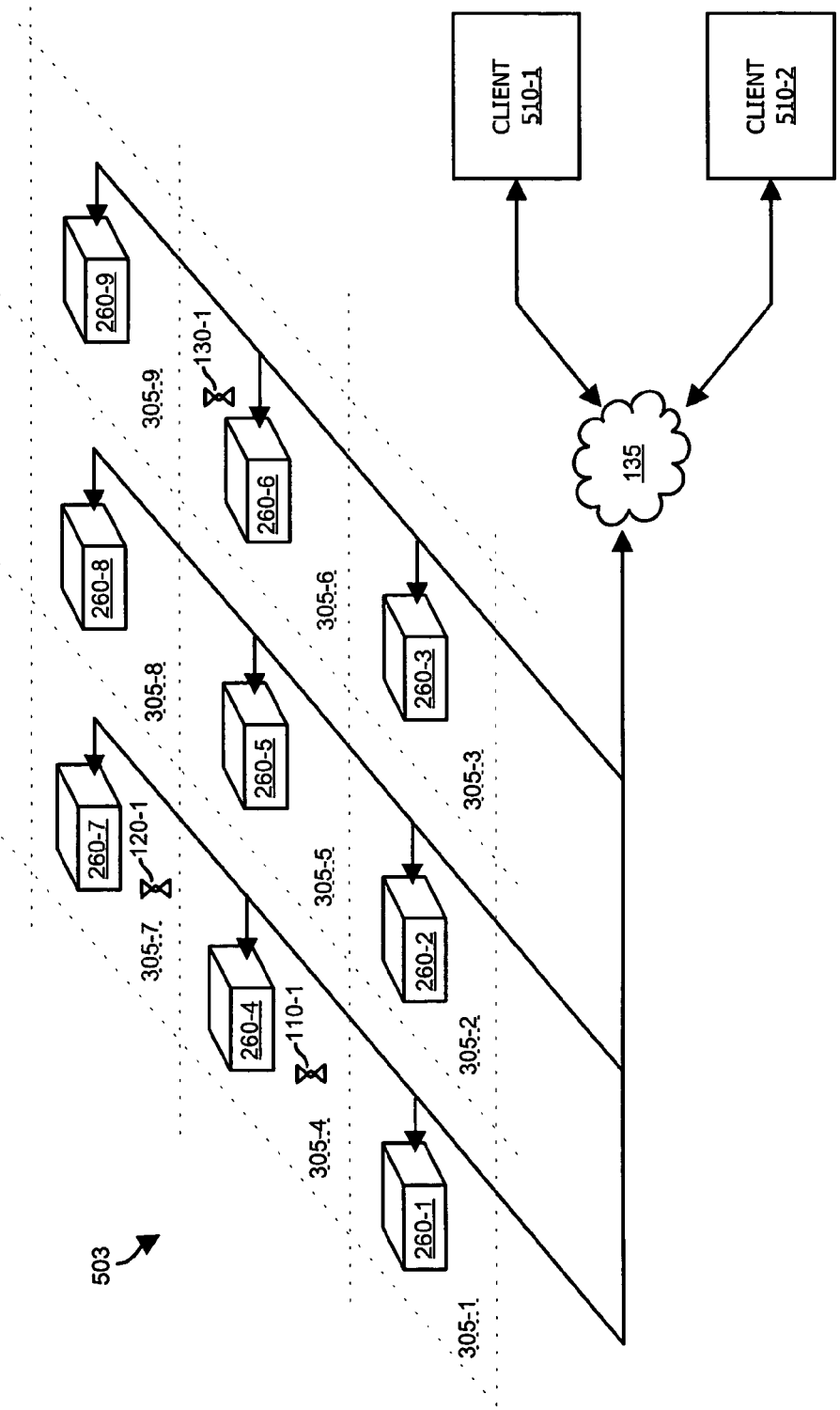
FIG. 7 is a diagram of a monitoring system including multiple configurable radio devices.

FIG. 7 is a diagram of multiple tag readers 260 to monitor a region for a presence of wireless identification tags 110, 120, 130. As shown, monitoring system 503 includes multiple tag readers 260 (such as programmable radio devices 160), network 135, and clients 510.

Each tag reader 260 monitors a corresponding region 305 for wireless identification tags 110, 120, 130. Clients 510 generate network messages (including protocol updates or agents) to one or multiple tag readers 260.

In one application, each tag reader 260 includes a custom program for repeatedly monitoring a presence of wireless identification tags 110, 120, 130. For example, tag readers 260 optionally include a program that is executed by processor system 220 to periodically interrogate respective regions 305 for wireless identification tags 110, 120, 130. Tag readers 260 process received tag information (e.g., characteristic data strings) and store the processed information locally in corresponding database 230 of tag readers 260. In one embodiment, tag readers 260 automatically coordinate scheduled interrogations to minimize interference with each other.

In addition to storing characteristic data strings associated with detected tags 110, 120, 130 tag readers 260 generate time stamp information for storage in database 230 to indicate a time of detecting a particular tag 110, 120, 130. Consequently, monitoring system 503 functions as an historical (or temporal) database distributed over a monitored area or geographic region. Clients 510 access data information stored in corresponding databases 230 using a logical address of each tag reader 260.

Network 135 (including connections to each tag reader 260) is optionally a Local-Area Network (LAN) such as that based on Ethernet, wireless Ethernet (IEEE 802.11), token ring, and/or AppleTalk®. Also, network 135 is optionally a wide-area network (WAN) such as a Public-Switched Telephone Network (PSTN), a cellular communications network, the Internet, and/or the World-Wide Web.

Hardware associated with clients 510 include electronic communication equipment such as personal computers, personal digital assistants, mainframe computers, distributed networks, enterprise hardware and software, and network device in general.

Because monitoring system 503 potentially includes many distributed memory devices 230 for storing information, a considerable amount of distributed storage is available for tracking items associated with wireless identification tags 110. Connectivity provided by network 135 enables multiple clients 510 to share resources associated with tag reader 260.

Database queries to each tag reader 260 can be structured in numerous ways. For example, client 510 optionally queries the entire database (such as collective databases associated with multiple tag readers 260) to locate a whereabouts of one or more particular wireless identification tags 110, 120, 130. In this instance, each tag reader 260 receives the client request message for information relating to the particular tag 110.

In response to receiving the request for information, each tag reader 260 queries its corresponding database 230 or generates a new wireless identification tag query via wireless signal 108 to find a wireless identification tag 110, 120, 130. Tag readers 260 having information associated with the request message then send appropriate information over network 135 to requesting clients 510.

In another application, monitoring system 503 is queried to locate all tags 110, 120, 130 currently residing within a predetermined sub-area such as collective regions 305-1, 305-2, 305-4, and 305-5. In this instance, only tag readers 260 (260-1, 260-2, 260-4 and 260-5) search for the tags and respond to the query. A balance of tag readers do not needlessly reply to the query.

Monitoring system 503 also can be queried to track the progress of one or more tagged items as they travel through one or multiple regions 305. For example, clients 510 optionally generate requests to tag readers 260 for information relating to particularly identified tags 110, 120, 130 at a specified time or interval of time. Based on reply information from tag readers 260, clients 510 can track how long an item tagged with a wireless identification tag and corresponding item is present in a particular region 305. Monitoring system 503 thus provides users with the ability to track inventory, identify bottlenecks, and identify lost, stolen, or outdated inventory.

Figure 8:
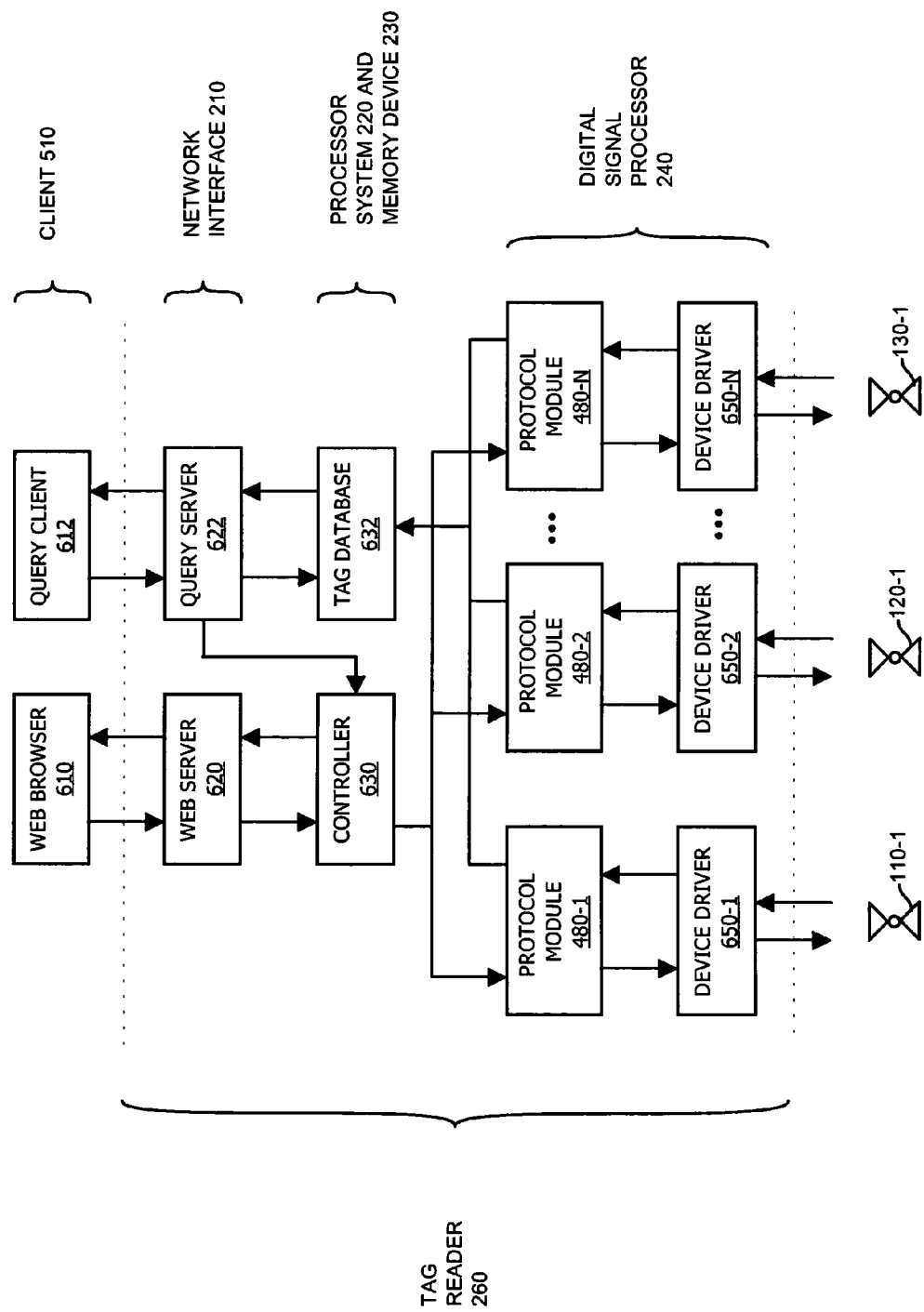
FIG. 8 is a diagram of a software architecture associated with a programmable radio device.

FIG. 8 is a diagram of a potential software architecture associated with tag readers 260. As shown, the software architecture includes web browser 610, web server 620, controller 630, query client 612, query server 622, tag database 632, protocol modules 480-1, . . . , 480-N, and device drives 650-1, . . . , 650-N.

In general, clients 510 execute software to manage tag readers 260 disposed over network 135. Among other tasks, client software enables remotely located users to query tags 110, 120, 130 and reconfigure tag reader 260 (or multiple tag readers 260) to support a different set of wireless communication protocols. For example, clients 510 reconfigure tag reader 260 to support an additional protocol to communicate with a new type of wireless identification tag. Clients 510 execute client software on web browser 610 or query client 612. In one application, client software is embodied as web browser 610 such as a browser-based java query interface hosted by tag reader 260. Alternatively, client software is embodied as query client 612 such as a higher-level data handling infrastructure (e.g., Savant) supporting SQL queries.

Software requests generated by web browser 610, and query client 612 includes instructions such as search for tags, reconfigure tag reader, and retrieve tag information stored in database.

Communications between web browser 610 and web server 620 are supported via a protocol such as HTTP (Hypertext Transfer Protocol) and communications between query client 612 and query server 622 are supported by a protocol such as SQL (Structured Query Language).

Instructions processed by web server 620 are conveyed to controller 630 and tag database 632 via a general purpose interface bus such as the HPI (Host Processor Interface Bus) present on the digital signal processor. Requests for tag information are serviced by retrieving the appropriate information from tag database 632 and sending it back to the requestor through query server 622 or web server 620.

In response to a reconfiguration request from either web browser 610 or query chart 612, controller 630 reconfigures digital signal processor 240 to support a new protocol module 480 for communicating with certain types of wireless identification tags 110, 120, 130.

Protocol modules 480 communicate with device drivers 650 that enable transmission and reception of radio signals to and from wireless identification tags 110, 120, 130. Results of a search are stored in tag database 632 and are sent back to a user at web browser 610 or query client 612.

Layering software in this way renders it easier to support additional protocols or modify existing protocols because adding support for protocols involves modifying software in protocol modules 480 and/or device drivers 650. Software in the rest of the system is minimally if at all changed.

Figure 9:
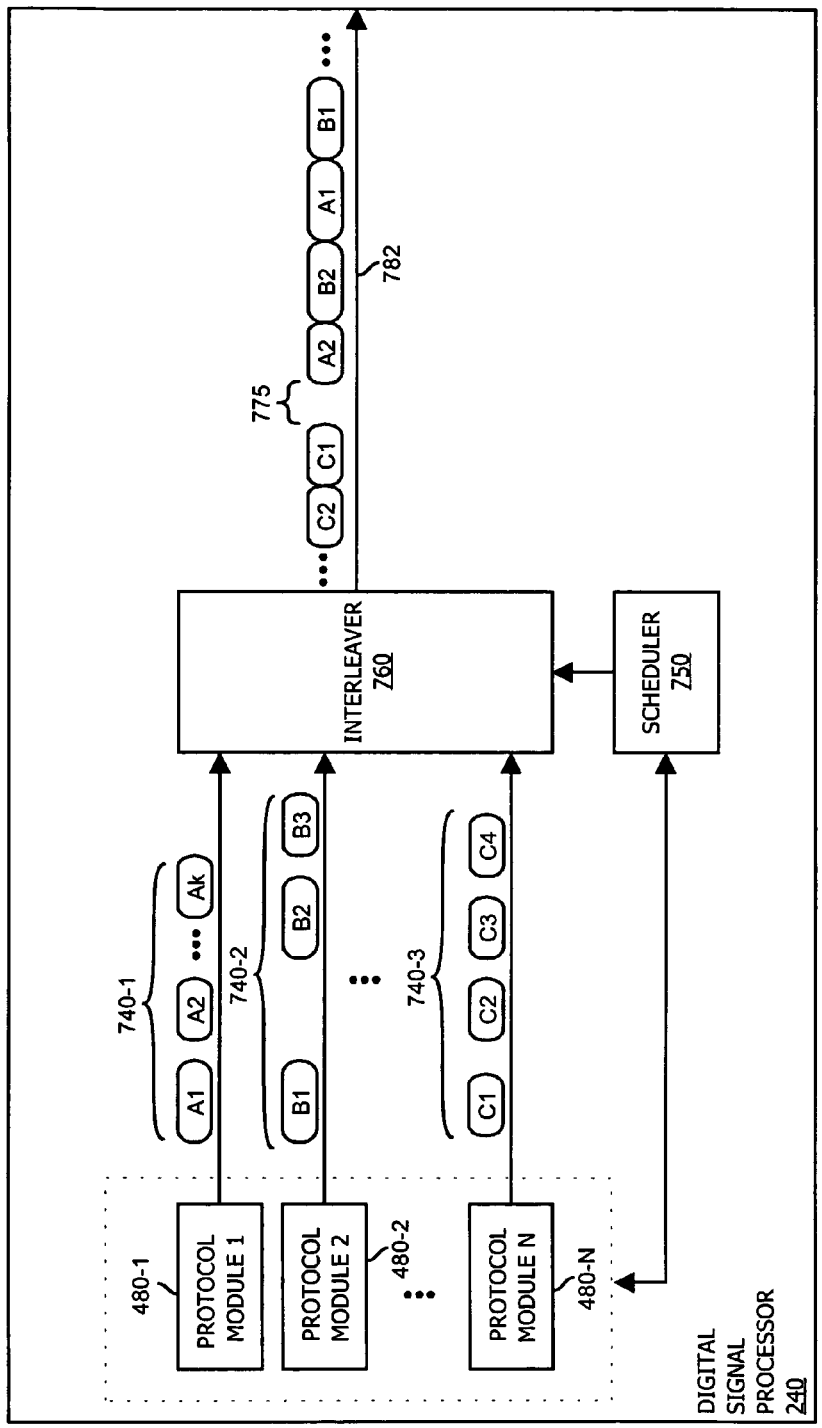
FIG. 9 is a block diagram illustrating a system and method for interleaving portions of radio communications to communicate with different types of wireless identification tags.

FIG. 9 is a detailed block diagram of digital signal processor 240. As shown, digital signal processor 240 includes protocol modules 480-1, 480-2, . . . , 480-N, scheduler 750, and interleaver 760.

As mentioned, one aspect of the present invention is directed towards a tag reader 260 that interleaves portions of radio communications to communicate with multiple types of wireless identification tags 110, 120, 130. Scheduling logical sequences of radio communications (or protocols) one after the other, according to conventional methods, results in 'dead' time when hardware such as frequency converter 245, transceiver interfaces 440, and antennas 450, 460 are not used. For example, consider that most protocols for communicating with a type of wireless identification tag 110, 120, 130 include an interval of time when transceiver circuitry of tag reader 260 is neither transmitting nor receiving data information. This is an unnecessary waste of hardware resources. Thus, interleaving portions of radio communications (or protocols) reduces any dead time between transactions and, thus, a time it takes to otherwise monitor a region for wireless identification tags 110, 120, 130. Interleaving portions of radio communications also potentially reduces an amount of power consumed by tag reader 260.

Protocol modules 480 generate different protocols 740 (such as unique bit sequences) to communicate with different types of wireless identification tags 110, 120, 130. Protocols 740 associated with a particular type of tag are parsed into work units to support flexible scheduling. For example, protocol 740-2 from protocol module 480-1 is divided into work units (portions) A1, A2, . . . , Ak. Likewise, protocol 740-2 from protocol module 480-2 is divided into work units (portions) B1, B2, and B3; protocol 740-N 2 from protocol module 480-N is divided into work units (portions) C1, C2, C3, and C4. Collectively, work units of a corresponding protocol 740 form a logical transaction or radio communication such as a query (read) or write command associated with a particular type of wireless tag 291. In one application, a logical transaction includes a series of address query commands to identify address of each tag in the monitored region.

In one application, protocol module 480 employs a specific protocol to identify an address of each tag 291 in a monitored region. For example, a first portion of the specific protocol involves generating a universal message to determine if any wireless tags 291 of a particular type are located in the monitored region. Multiple tags 291 may respond simultaneously to indicate that they are present. If so, tag reader 260 generates successively narrower queries (additional portions of the protocol) to potential sets of wireless tags 291 to identify tags in a given monitored area. Eventually, tag reader 260 narrows the queries enough to identify each and every address of tags 291 in the monitored region. Interleaving protocols enables tag reader 260 to monitor an area at least a minimum rate so that tag reader 260 can identify even fast-moving tags 291 such as those on conveyor belts that would otherwise be missed.

Based on input provided from scheduler 750 (such as a real-time scheduler) indicating an order for interleaving radio communications (protocols 740), interleaver 760 generates output signal 782 including interleaved work units (such as sequence of work units B1, A1, B2, A2, C1, C2 . . . ) from multiple protocols to communicate with different types of wireless identification tags 110, 120, 130.

Protocols 740 may each have an associated set of rules for scheduling work units associated with a particular radio communication protocol 740. For example, certain work units associated with a protocol 740 may need to be executed within a specified period of time. Other work units and protocols 740 may have no restrictions on when work instructions must be executed. Based on the set of rules for scheduling protocols 740, scheduler 750 identifies how to schedule and interleave the radio communications.

Scheduler 750 can not perform work units at certain times such as time period 775 because it may cause corruption of data associated with certain tags 291.

Breaking down the protocols into portions supports more efficient collection of data information associated with the wireless identification tags in the monitored region because protocols 740 (radio communications) can be scheduled in many more ways than simply scheduling one entire radio communication transaction after the other. For example, in one application, scheduler 750 randomly interleaves portions of radio communications with no particular preference given to each of the multiple types of wireless identification tags 110, 120, 130.

In another application, scheduler 750 interleaves portions of radio communications for each of different protocols 740 in a round robin fashion. In yet another application, scheduler 750 selectively schedules the portions of radio communications by allocating more scheduling time for one particular type of protocol 740 over another. In still another application, scheduler 750 identifies redundant portions of the radio communications and schedules only non-redundant portions of the radio communications. Further, in yet another application, scheduler 750 schedules and interleaves portions of the radio communications based on priority to more frequently check a presence of a certain type of wireless identification tags in the monitored region. Scheduler 750 also employs any combination of the aforementioned techniques to schedule radio communications.

In a further application, scheduler 750 interleaves portions of wireless communications, or intentionally incorporates "dead time" in response to wireless signals received by the transceiver. This may take the form of a simple channel occupancy measurement, or a more complex interception of another communication between a wireless tag reader and a tag, between two wireless tag readers, or between any other systems occupying the same frequency range. This operation can be treated as a special case of a scheduled wireless transmission event to improve the interoperability of a plurality of wireless tag readers in the case where they may mutually interfere, or to improve interoperability between wireless tag readers and any other wireless communication system in the case where the wireless tag readers cause or receive interference to or from said other wireless communication system.

Scheduler 750 may also affect the modulation type, operating frequency, or any other parameter of the wireless communication to achieve any of these goals.

Additional aspects of scheduler 750 and related hardware and software functions may include: introducing a period of time including no wireless transmissions from the radio device to wireless identification tags in the monitored region, changing an operating frequency to improve interoperability among multiple wireless devices simultaneously communicating in a common area, identifying redundant portions of radio communications and optimizing by scheduling only non-redundant portions of the radio communications, identifying otherwise interfering portions of the radio communications and optimizing by scheduling only non-interfering portions of the radio communications, and monitoring wireless signal characteristics (such as channel occupancy) to reduce interference with other wireless communication devices sharing a common area.

Distributing tag readers 260 over a network enables the establishment of a Tag Services Provider (TSP) such as a management entity that handles maintenance of tag readers 260 as well as processing of tag information. For example, a small retail business may purchase or lease a tag reader but rely on the TSP to enable different applications (via agents) such as those associated with a particular retail store. Accordingly, the TSPs assist everyday users in maintaining a personal inventory of their tagged objects on a remote server, similar to the manner in which Hotmail™ manages a user's inventory of e-mail.

TSPs can assist during situations when network connectivity is intermittent or non-existent due to network failures. For example, tag reader 260 may continue to store tag transactions within its internal database even without a network connection. Configured according to an offline (proxy server) processing model, the tag reader (having stored the tag transactions) forwards them to the TSP when connectivity is re-established.

Tag readers 260 can be used in many ways. For example in one application, a networked tag reader 260 is configured to automatically notify a user when an article bearing a specific tag registered by a reader or by a class of readers is in physical location monitored by a particular tag reader 260. For example, a filing cabinet can be configured with a networked tag reader 260 to notify an administrator when a specific document has been filed in the filing cabinet.

In another application, a book collector may generate a request for a specific book along with an offer to purchase it for a specified amount of money. When an owner of the book passes by tag reader 260, the tag reader 260 notifies the owner of the offer.

In yet another application, a librarian can utilize a handheld tag reader 260 that is pre-configured to include tag IDs of books potentially being sought. The librarian can be notified when the tag reader 260 detects a particular wireless tag 291 associated with a sought-after book within the vicinity of tag reader 260. In still another example, a web application can issue a search command for a class of items or specific items themselves. Tag reader 260 will respond with location information associated with a specific tagged item.

Figure 10:
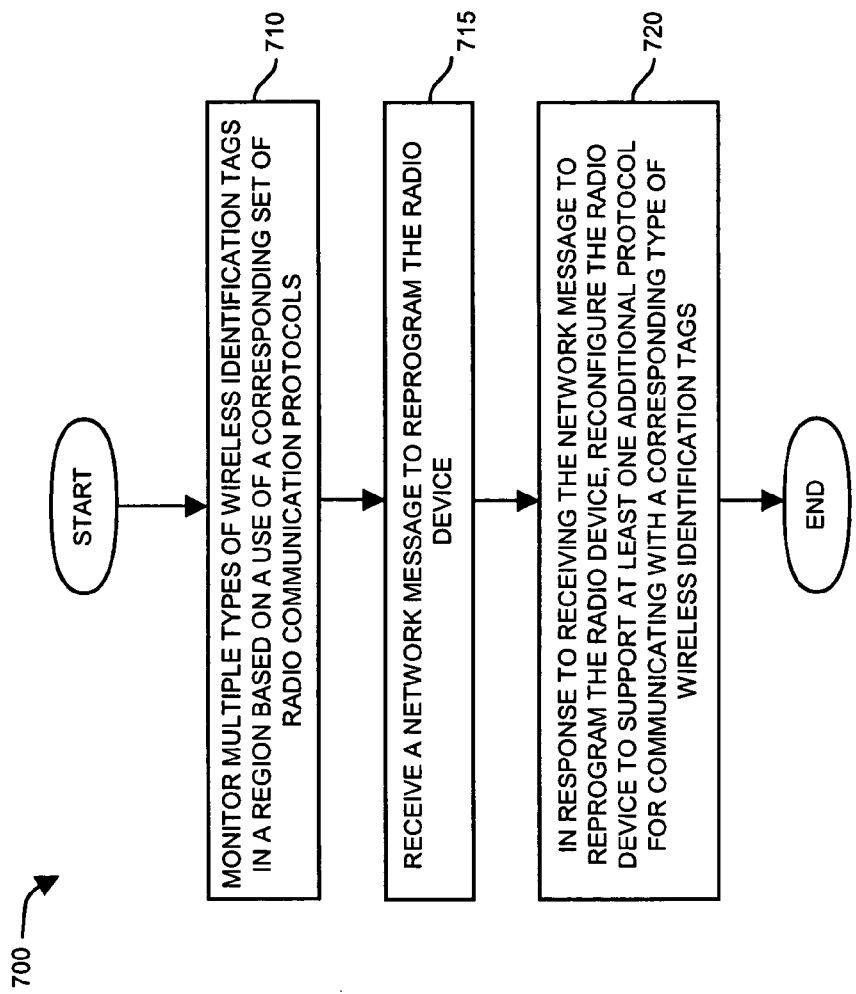
FIG. 10 is a flow chart illustrating a method of reconfiguring a programmable radio device to support an additional wireless tag protocol.

FIG. 10 is a flow chart illustrating a method of operating a tag reader 260 that communicates with wireless identification tags 110, 120, 130.

In step 710, tag reader 260 monitors multiple types of wireless identification tags 110, 120, 130 based on utilization of a corresponding set of protocols. In step 715, tag reader 260 receives network message 142 (FIG. 1) to reprogram tag reader 260 such as reconfiguring its associated transceiver interface 472 for communicating with an additional protocol. In step 720, tag reader 260 reconfigures its transceiver interface 472 to support radio communications based on the additional protocol.

Figure 11:
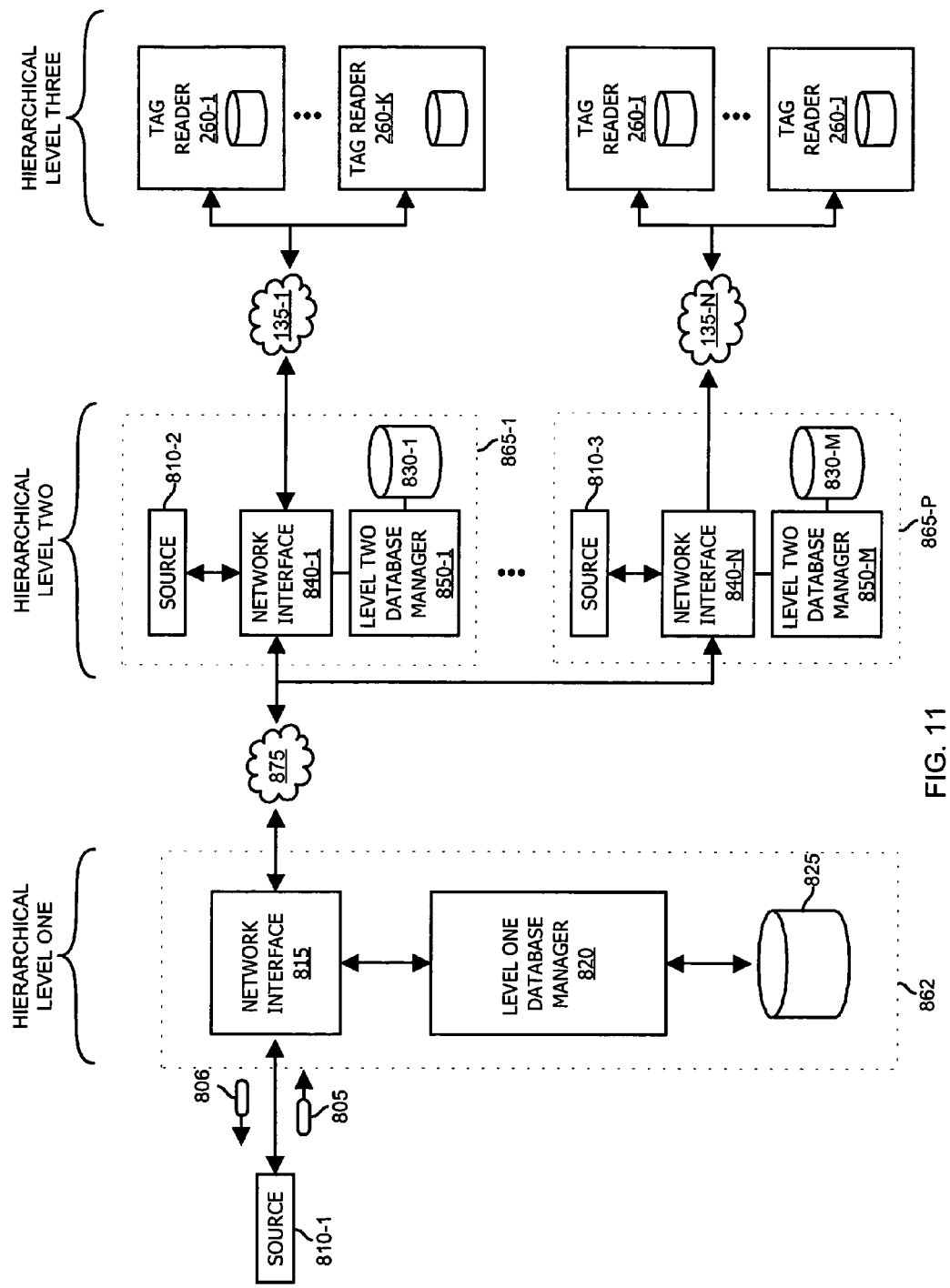
FIG. 11 is a block diagram of hierarchical database including multiple wireless tag readers.

FIG. 11 is a block diagram of a network of tag readers forming part of a hierarchical database. As shown, hierarchical level one includes, network interface 815, level one database manager 820, and memory device 825. Hierarchical level two includes source 810-2, network interface 840-1, level two database manager 850-1, memory device 830-1, source 810-3, network interface 840-N, level two database manager 850-M, and memory device 830-M. Hierarchical level three includes tag readers 260-1, . . . , 260-k and 260-i, . . . , 260-j. The system as shown is easily scalable by adding hardware and software at different levels.

Collectively, hierarchical level one, two and three form a hierarchical database. Tag readers 260 monitor local populations of wireless identification tags 110, 120, 130. Level two database managers 850 manage multiple tag readers and create their own database for storage in corresponding memory device 830. At yet a higher level, level one database manager 820 manages hierarchical level two and level three as well as its own database stored in memory device 825.

In the context of a supply chain, sets of tag readers 260 in hierarchical level 3 are employed to monitor different sites. For example one set of tag readers 260 monitors wireless tags 110, 120, 130 (FIG. 7) in a manufacturing facility. Another set of tag readers 260 monitors wireless tags 110, 120, 130 in a warehouse. Yet another set of tag readers 260 monitors a shipping container that delivers tagged items to a retailer. Still another set of tag readers 260 monitors wireless tags 110, 120, 130 at a consumer outlet such as a retail store. Based on this topology, wireless identification tags 110, 120, 130 and corresponding retail items can be tracked from manufacturing to actual sale at a cashier in a retail store.

Each site including networked tag readers 260 optionally includes a local monitor system 865 (hierarchical level 2) to track a movement of wireless identification tags 110, 120, 130 and corresponding products. For example, level two database manages 850 retrieve relevant information from tag readers 260 for storage in memory devices 830. Based on information collected from tag readers 260 at a particular site, appropriate corrective action can be taken to rectify, for example, a bottleneck or other corresponding problems at the monitored site.

At a higher level (namely, hierarchical level one), monitor system 862 oversees a whole supply chain including tag readers 260 and level two monitor systems 865. In one application, monitor systems 862 is located at headquarters of a company that monitors the supply chain. In this way, wireless tags 110, 120, 130 can be automatically monitored from remote locations.

Disposing tag readers 260 (including memory device 230) to form a hierarchical database reduces a burden of having to continuously transmit and process data information from tag readers 260. For example, tag reader 260 stores collected information in corresponding memory device 230 instead of sending all raw data to a centralized storage device such as memory device 830. As information is needed, monitor systems 862, 865 generate requests to tag reader 260 for such data. Also, tag readers 260 compile, process and generate reports that are sent to monitor system 862, 865. Processing raw collected data at tag readers 260 reduces an amount of processing required at other hierarchical levels.

As previously discussed, tag readers 260 are reconfigurable via network messages. In the hierarchical system in FIG. 11, sources 810 transmit messages 805 to reconfigure tag readers 260 so they support a new set of wireless identification tag protocols. Confirmation of changes to tag reader 260 can be received via messages 806.

Tag readers 260 can be reconfigured by proactively 'pulling' software or protocol information from a remote location. For example, tag reader 260 may periodically poll a remote source such as source 810-1 for updates software. Additionally, tag reader 260 may proactively retrieve updates from a remote source such as 810-2 after receiving an update command received from source 810-1.

In addition to generating reconfiguration instructions, messages 806 support transmission of agents to tag readers 260. The agents are executed at tag readers 260 and, in response to satisfying a condition of the agent, report appropriate information back to source 810 via messages 806. Conditions associated with an agent include detecting events such as sensing that multiple tags 291 are no longer in a particular monitored region such as a store shelf of a retail store.

In one application, agents are generated by different functional groups of an organization and each group monitors different aspects of a supply chain. For example, a marketing group may generate an agent that reports information regarding how long a certain type of product sits on a shelf at a particular retail store. An operations group may generate agents to identify bottlenecks in the supply chain being monitored. Based on information reported by the agents, the functional groups of a corporation managing different aspects of a supply chain can make appropriate business decisions.

It should be noted that agents are not merely limited executed to report data information back to a corresponding source 810. They are optionally employed to perform any type of processing task at a tag reader 260. For example, agents can be used to program tag readers 260 with application software.

As mentioned, tag reader 260 optionally executes multiple agents, each of which includes its own set of instructions for retrieving wireless tag 291 information. To optimize use of a wireless spectrum, scheduler 750 identifies a minimum superset of transactions to perform the functional tasks associated with multiple agents. Without optimizing, tag reader 260 may otherwise perform needless tasks such as redundant tag queries.

Figure 12:
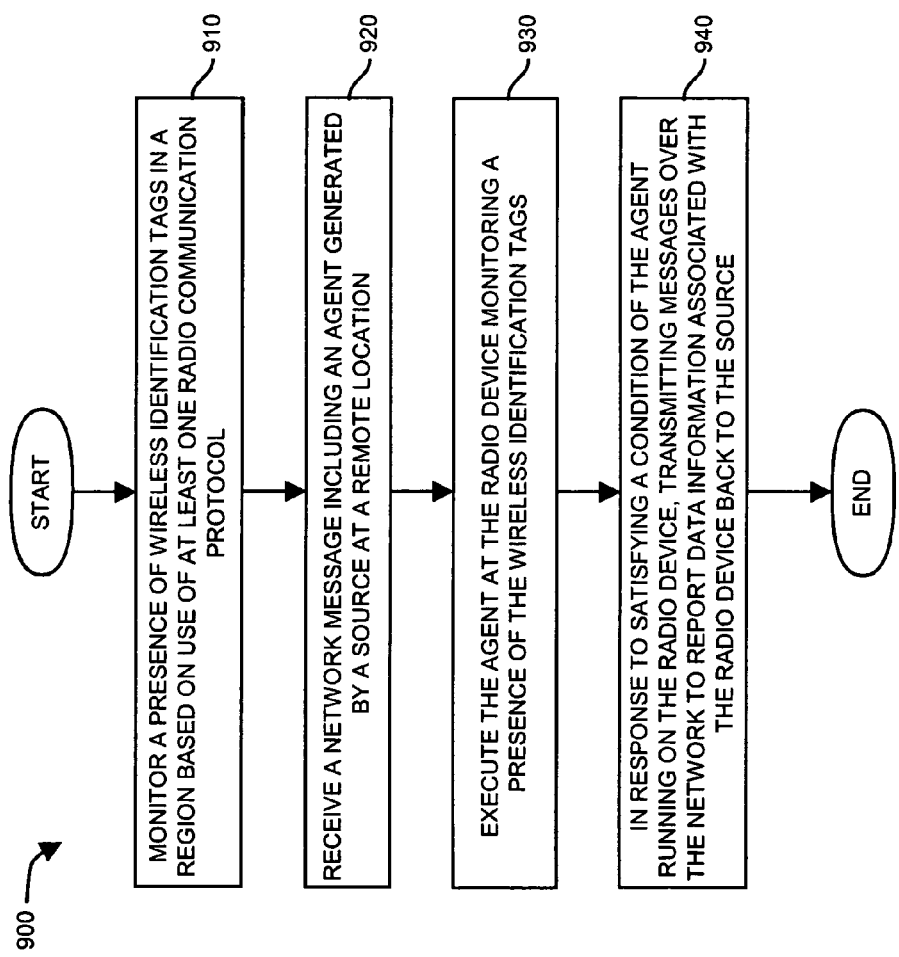
FIG. 12 is a flow chart illustrating a method of utilizing agents to execute tasks at wireless identification tag readers.

FIG. 12 is a flow chart 900 including a method of utilizing agents to execute tasks at tag readers 260.

In step 910, tag reader 260 monitors a presence of wireless identification tags 110, 120, 130 based on a use of at least one radio communication protocol.

In step 920, tag reader 260 receives a network message including an agent generated by a source at a remote location.

In step 930, tag reader 260 executes the agent by performing tasks specified therein.

In step 940, tag reader 260 transmits reporting messages including data information associated with the tag reader 260 in response to satisfying a condition of the agent.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method comprising:
   initiating communications with at least one type of wireless identification tags in a monitored region based on use of a corresponding at least one radio communication protocol; and
   while carrying out the communications, interleaving i) a portion of dead time during which no portion of the at least one radio communication protocol is transmitted, and ii) a portion of active time during which different portions of the at least one radio communication protocol is transmitted for purposes of communicating with wireless identification tags in the monitored region
   wherein initiating communications with the at least one type of wireless identification tags in the monitored region includes:
   initiating communications with at least two different types of wireless identification tags in the monitored region based on use of a corresponding set of different radio communication protocols,
   initiating a first communication with a first type of wireless identification tag in the region based on use of a first radio communication protocol; and
   initiating a second communication with a second type of wireless identification tag in the monitored region based on use of a second radio communication protocol;
   wherein interleaving the portion of dead time includes interleaving a respective portion of dead time during which no portion of the corresponding set of different radio communication protocol is transmitted; and
   wherein interleaving the portion of active time includes interleaving a respective portion of active time during which different portions of the corresponding set of different radio communication protocols are transmitted for purposes of communicating with wireless identification tags in the monitored region.

2. A method as in claim 1 further comprising:
   interleaving the portion of dead time with the active time for purposes of reducing interference with other radio devices in the region attempting to communicate with the wireless identification tags.

3. A method as in claim 1 further comprising:
   receiving wireless signals associated with at least one other tag reader; and
   wherein interleaving the dead time occurs in response to reception of the wireless signals in the monitored region.

4. A method as in claim 3, wherein receiving the wireless signals includes:
   during the dead time, performing a channel occupancy measurement to identify presence of the wireless signals in the monitored region.

5. A method as in claim 1 further comprising scheduling receive time during the portion of dead time for purposes of intercepting a communication from a wireless identification tag in the monitored region.

6. A method as in claim 1, wherein interleaving the portion of active time includes scheduling a portion of the second communication for transmission in the monitored region some time between a first portion of the first communication and a second portion of the first communication, the first portion and the second portion of the first communication being associated with a same logical transaction even though not transmitted in a contiguous block of time.

7. A method as in claim 5, wherein the receive time is scheduled for purposes of aiding in reduction of interference with other radio devices attempting to communicate in the monitored region.

8. A method as in claim 1, wherein the interleaving comprises:
   interleaving portions of the at least one corresponding radio communication protocol with i) transmit time during which portions of the at least one communication protocol are used to communicate with the at least one type of wireless identification tags, and ii) receive time during which no portion of any of the at least one radio communication protocol are transmitted in the region.

9. A method as in claim 8 further comprising:
   scheduling receive time amongst the transmit time for purposes of intercepting a communication between a remote tag reader and a corresponding wireless identification tag in the region.

10. A method as in claim 8, wherein the receive time is dead time associated with a respective transmitter, the receive time being scheduled for purposes of aiding in reduction of interference with other radio devices attempting to communicate in the region.

11. A method as in claim 8 further comprising:
initiating inclusion of a receive time amongst the transmit time for purposes of receiving wireless signals associated with a tag reader.

12. A method as in claim 11, wherein interleaving the receive time occurs in response to reception of the wireless signals from at least one of multiple wireless identification tags in the region.

13. A method as in claim 11 further comprising:
performing a channel occupancy measurement to identify a presence of the wireless signals in the region.

14. A method comprising:
initiating communications associated with each of multiple types of wireless identification tags in a monitored region;
to carry out the communications, interleaving portions of different types of wireless communication protocols understood by the multiple types of wireless identification tags; and
amongst interleaved portions of the different types of wireless communication protocols, implementing transmit dead times for purposes of receiving communications associated with at least one radio device in the monitored region;
wherein the interleaving and implementing comprise:
during a first time range, transmitting a respective portion associated with a first protocol of the different types of wireless protocols;
during a second time range following the first time range, preventing transmission of any portions of the different radio communication protocols in the monitored region; and
during a third time range following the second time range, transmitting a respective portion associated with a second protocol of the different types of wireless protocols.

15. A method as in claim 14, wherein the second time range is dead time associated with a respective transmitter, the second time range being scheduled for purposes of aiding in reduction of interference with other radio devices attempting to communicate in the monitored region.

16. A method as in claim 14 further comprising:
utilizing a common transmitter resource of a respective wireless identification tag reader to transmit the respective portion associated with the first protocol and the respective portion associated with the second protocol.

17. A method comprising:
initiating communications with multiple wireless identification tags in a region based on use of at least one corresponding radio communication protocol; and
interleaving at least one of different data rates and different bit durations for transmitting respective portions of the at least one corresponding radio communication protocol to communicate with the multiple wireless identification tags in the region;
wherein interleaving the at least one of different data rates and different bit durations includes:
scheduling a first duration of time in a respective transmit sequence for purposes of transmitting a corresponding portion of a first radio communication protocol; and
scheduling a second duration of time, which is different in length than the first duration of time and follows the first duration of time, in the respective transmit sequence for purposes of transmitting a corresponding portion of a second radio communication protocol.

18. A method as in claim 17, wherein the interleaving comprises: interleaving different modulation types for transmitting the respective portions of the at least one radio communication protocol to communicate with the multiple wireless identification tags in the monitored region.

19. A method comprising:
initiating communications with multiple wireless identification tags in a region based on use of at least one radio communication protocol; and
interleaving different modulation types for transmitting respective portions of the at least one radio communication protocol to communicate with the multiple wireless identification tags in the region;
wherein interleaving the different modulation types comprises:
scheduling a first duration of time in a transmit sequence associated with a transmitter for purposes of transmitting a corresponding portion of a first radio communication protocol according to a first modulation type; and
scheduling a second duration of time in the transmit sequence associated with the transmitter for purposes of transmitting a corresponding portion of a second radio communication protocol according to a second modulation type.

20. A method as in claim 19, wherein the interleaving comprises: interleaving use of different carrier frequencies for transmitting the respective portions of the at least one type of radio communication protocol to communicate with the at least one type of wireless identification tags in the monitored region.

21. A method as in claim 19, wherein scheduling the first duration of time in the transmit sequence includes allotting an amount of time for the transmitter to communicate with a respective first type of wireless identification tag in the region that understands the first radio communication protocol but not the second radio communication protocol; and
wherein scheduling the second duration of time in the transmit sequence includes allotting an amount of time for the transmitter to communicate with a respective second type of wireless identification tag in the region that understands the second radio communication protocol but not the first radio communication protocol.

22. A method comprising:
initiating communications with at least one type of wireless identification tags in a region based on use of a corresponding at least one type of radio communication protocol; and
interleaving use of different carrier frequencies for transmitting respective portions of the at least one type of radio communication protocol to communicate with the at least one type of wireless identification tags in the region;
wherein interleaving use of the different carrier frequencies includes:
scheduling a first duration of time associated with a transmitter for purposes of transmitting a corresponding first portion of a first type of radio communication protocol according to a first carrier frequency; and
scheduling a second duration of time after the first duration of time for purposes of transmitting a corresponding first portion of a second type of radio communication protocol from the transmitter according to a second carrier frequency.

23. A method as in claim 22, wherein interleaving use of the different carrier frequencies corresponds to interleaving different modulation types for transmitting the respective portions of the at least one radio communication protocol.

24. A method as in claim 22, wherein interleaving the carrier frequencies includes:
scheduling a third duration of time after the second duration of time for purposes of transmitting a corresponding second portion of the first type of radio communication protocol from the transmitter according to the first carrier frequency.

25. A method as in claim 24, wherein interleaving the carrier frequencies includes:
scheduling a fourth duration of time after the third duration of time for purposes of transmitting a corresponding second portion of the second type of radio communication protocol from the transmitter according to the second carrier frequency.

26. A method as in claim 24 further comprising:
although transmitted in different time durations, transmitting the corresponding first portion and the corresponding second portion of the first type of radio communication protocol as part of a same logical transaction.

27. A method as in claim 25 further comprising:
although transmitted in different time durations, transmitting the corresponding first portion and the corresponding second portion of the first type of radio communication protocol as part of a same logical transaction; and
although transmitted in different time durations, transmitting the corresponding first portion and the corresponding second portion of the second type of radio communication protocol as part of a same logical transaction.

28. A method as in claim 22, wherein interleaving use of the different carrier frequencies includes:
scheduling a first duration of time associated with a transmitter for purposes of transmitting a corresponding first portion of the at least one type of radio communication protocol according to a first carrier frequency; and
scheduling a second duration of time after the first duration of time for purposes of transmitting a corresponding second portion of the at least one type of radio communication protocol from the transmitter according to a second carrier frequency.

29. A method as in claim 28, wherein interleaving the carrier frequencies includes:
scheduling a third duration of time after the second duration of time for purposes of transmitting a corresponding second portion of the at least one type of radio communication protocol from the transmitter according to the first carrier frequency.

30. A method as in claim 19, further comprising:
partitioning each of at least two different types of wireless communication protocols that are used to communicate with the wireless identification tags in the monitored region; and
interleaving portions of the partitioned protocols on a same wireless identification tag reader output interface to communicate with the multiple types of wireless identification tags in the monitored region.

31. A method as in claim 30, wherein interleaving the portions of the partitioned protocols on the same wireless identification tag reader output interface includes:
scheduling a first protocol on the wireless identification tag reader output to monitor a first type of wireless identification tag at a higher rate than a second type of wireless identification tag in the monitored region.

32. A method as in claim 30, wherein interleaving the portions of the partitioned protocols on the same wireless identification tag reader output interface includes:
adapting a schedule used to interleave the portions of the partitioned protocols to account for monitoring a first type of wireless identification tags at a faster rate than a second type of wireless identification tags in the monitored region.

33. A method as in claim 32, wherein the step of adapting the schedule enables monitoring of the first type of wireless identification tags that move quickly through the monitored region compared to the second type of wireless identification tags that move more slowly through the monitored region.

34. A method as in claim 33 further comprising:
initiating modification of a respective schedule for interleaving the portions of the partitioned protocols on the same wireless identification tag reader output depending on a respective physical environment associated with the monitored region.

35. A method as in claim 30, wherein interleaving portions of the partitioned protocols includes randomly interleaving portions of the partitioned protocols on a given tag reader output channel to communicate with each of the multiple types of wireless identification tags.

36. A method as in claim 30, wherein interleaving portions of the partitioned protocols includes interleaving portions of the partitioned protocols in a round robin fashion on a given tag reader output channel to communicate with each of the multiple types of wireless identification tags.

37. A method as in claim 30 further comprising
allocating more scheduling time on the wireless identification tag reader output to transmit respective portions of a first type of protocol understood by a first type of wireless identification tags than corresponding scheduling time for transmitting respective portions of a second type of protocol on the wireless identification tag reader output to communicate with a respective second type of wireless identification tags.

38. A method as in claim 19, further comprising:
interleaving portions of different commands formatted according to respective different wireless radio communication protocols for communicating with the different types of wireless identification tags in the region.

39. A method as in claim 38, wherein interleaving the portions of different commands includes:
scheduling a first duration of time for purposes of transmitting a corresponding first portion of a first command;
scheduling a second duration of time in a time sequence after the first duration of time for purposes of transmitting a corresponding first portion of a second command.

40. A method as in claim 39, wherein interleaving the portions of different commands includes:
scheduling a third duration of time after the second duration of time for purposes of transmitting a corresponding second portion of the first command.

41. A method as in claim 40, wherein interleaving the portions of different commands includes:
scheduling a fourth duration of time after the third duration of time for purposes of transmitting a corresponding second portion of the second command.

42. A method as in claim 38 further comprising:
partitioning a query command into multiple respective units associated with a first protocol; and
interleaving the multiple respective units amongst other communications on a common output communication channel of a wireless identification tag reader for purposes of learning an identity of different wireless identification tags in the region.

43. A method as in claim 38 further comprising:
interleaving the portions of the different commands onto a shared output channel of a respective wireless identification tag reader for purposes of monitoring one type of wireless identification tag at a higher rate than another type of wireless identification tag in the region.

44. A method as in claim 19, further comprising:
interleaving portions of the corresponding at least one radio communication protocol from a radio device to communicate with the at least one type of wireless identification tags in the monitored region.

45. A method as in claim 44, wherein interleaving the portions includes interleaving work units associated with the at least one type of radio communication protocol, the work units forming a logical radio transaction associated with a particular type of wireless identification tag in the monitored region.

46. A method as in claim 45, wherein interleaving the work units produces at least one of a read and a write with respect to the particular type of wireless identification tags in the monitored region.

\* \* \* \* \*